(12) United States Patent
Hikishima

(10) Patent No.: US 7,489,767 B2
(45) Date of Patent: Feb. 10, 2009

(54) TERMINAL DEVICE AND COMMUNICATION CONTROL METHOD

(75) Inventor: Naoki Hikishima, Tokyo (JP)

(73) Assignee: NEC Corporation, Tokyo (JP)

( * ) Notice: Subject to any disclaimer, the term of this patent is extended or adjusted under 35 U.S.C. 154(b) by 1200 days.

(21) Appl. No.: 10/282,094

(22) Filed: Oct. 29, 2002

(65) Prior Publication Data

US 2003/0081739 A1 May 1, 2003

(30) Foreign Application Priority Data

Oct. 30, 2001 (JP) ............................. 2001-332769

(51) Int. Cl.
*H04M 11/00* (2006.01)
(52) U.S. Cl. .............. 379/88.14; 379/88.01; 379/93.17; 455/414.4; 455/563; 455/566
(58) Field of Classification Search .............. 455/414.4; 379/88.14
See application file for complete search history.

(56) References Cited

U.S. PATENT DOCUMENTS

| | | | | |
|---|---|---|---|---|
| 5,283,833 A * | 2/1994 | Church et al. | ............... | 705/252 |
| 5,539,811 A * | 7/1996 | Nakamura et al. | ........ | 379/93.14 |
| 5,651,056 A * | 7/1997 | Eting et al. | .............. | 379/88.01 |
| 5,889,852 A * | 3/1999 | Rosecrans et al. | ....... | 379/355.05 |
| 5,995,590 A * | 11/1999 | Brunet et al. | ................. | 379/52 |
| 6,100,882 A * | 8/2000 | Sharman et al. | ............. | 704/235 |
| 6,222,909 B1 * | 4/2001 | Qua et al. | ................. | 379/88.22 |
| 6,278,772 B1 * | 8/2001 | Bowater et al. | ........... | 379/88.13 |
| 6,292,781 B1 * | 9/2001 | Urs et al. | .................. | 704/270.1 |
| 6,307,921 B1 * | 10/2001 | Engelke et al. | ................ | 379/52 |
| 6,366,651 B1 * | 4/2002 | Griffith et al. | ............. | 379/88.14 |
| 6,377,822 B1 * | 4/2002 | Grimes | ........................ | 455/566 |
| 6,393,014 B1 * | 5/2002 | Daly et al. | ................... | 370/352 |
| 6,476,815 B1 * | 11/2002 | Ando | .......................... | 345/473 |
| 6,665,547 B1 * | 12/2003 | Ehara | .......................... | 455/563 |
| 6,721,698 B1 * | 4/2004 | Hariharan et al. | ........... | 704/203 |
| 6,810,115 B2 * | 10/2004 | Fukuda | ................... | 379/142.01 |
| 6,820,055 B2 * | 11/2004 | Saindon et al. | ............. | 704/235 |
| 6,829,243 B1 * | 12/2004 | Sundhar | ..................... | 370/401 |
| 6,917,917 B1 * | 7/2005 | Kim | ............................. | 704/235 |
| 6,947,890 B1 * | 9/2005 | Kitazoe et al. | .............. | 704/232 |
| 2001/0047258 A1 * | 11/2001 | Rodrigo | ....................... | 704/256 |

FOREIGN PATENT DOCUMENTS

| | | |
|---|---|---|
| CN | 1190840 A | 8/1998 |
| EP | 0 851 403 A2 | 7/1998 |
| EP | 0 872 827 A2 | 10/1998 |
| GB | 2 082 820 A | 3/1982 |
| GB | 2 183 880 A | 6/1987 |

(Continued)

*Primary Examiner*—Fan Tsang
*Assistant Examiner*—Simon Sing
(74) *Attorney, Agent, or Firm*—Sughrue Mion, PLLC

(57) ABSTRACT

A terminal device as a first communication party's terminal has: voice recognition means which, during a communication connection to a second communication party's terminal, when the mode is set to a voice recognition mode receives, as digital voice signals, the second communication party's voice sent from the second communication party's terminal and performs voice recognition to convert the digital voice signals to text data; and control means for performing control in such a manner that the text data converted by the voice recognition means are output from output means.

10 Claims, 14 Drawing Sheets

FOREIGN PATENT DOCUMENTS

| | | |
|---|---|---|
| GB | 2 323 693 A | 9/1998 |
| GB | 2 362 745 A | 11/2001 |
| GB | 2 372 864 A | 9/2002 |
| JP | H04-063044 A | 2/1992 |
| JP | H04-222152 A | 8/1992 |
| JP | H06-303314 A | 10/1994 |
| WO | WO 87/05735 A1 | 9/1987 |

* cited by examiner

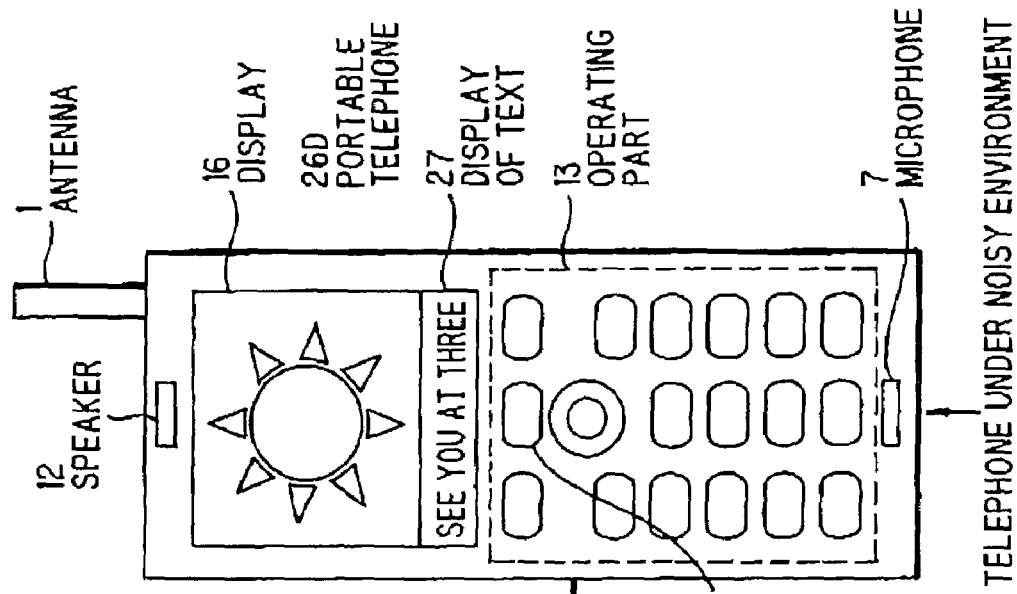
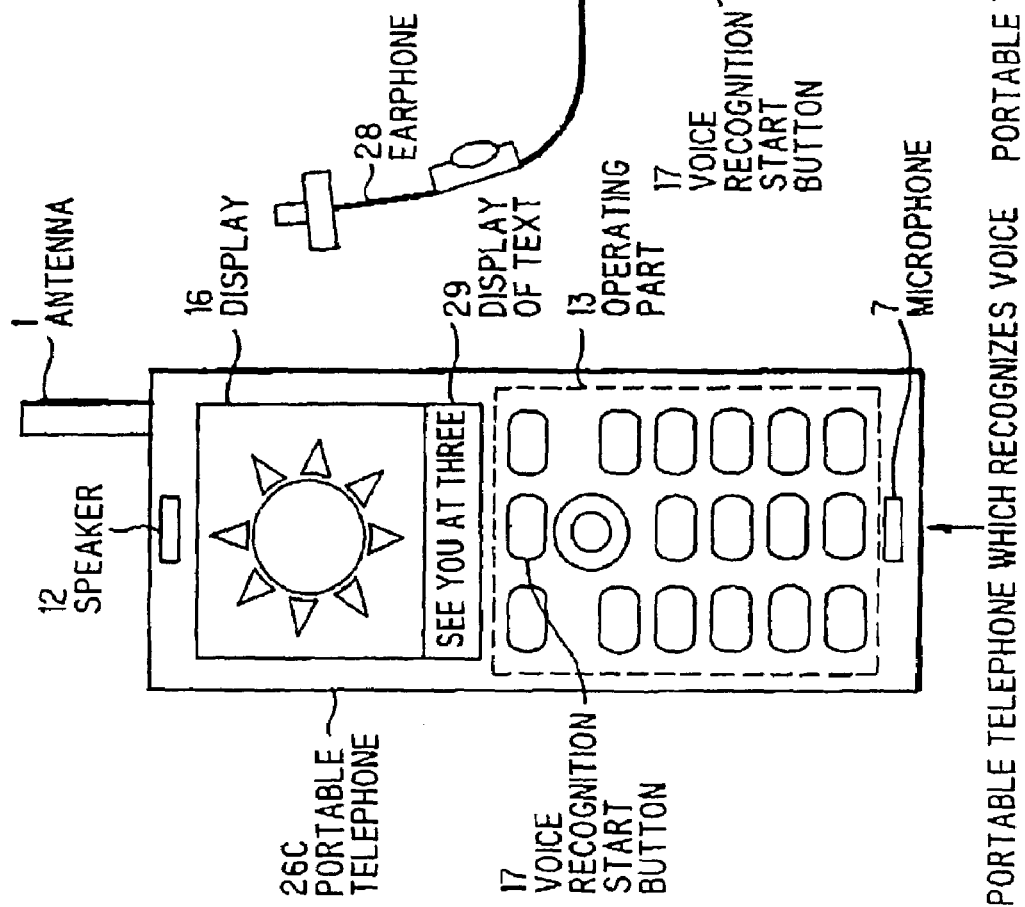

TERMINAL DEVICE AND COMMUNICATION CONTROL METHOD

FIELD OF THE INVENTION

The invention relates to a mobile communication system and particularly to a terminal device, which has the function of performing voice recognition of the other party's speech, for example, in a mobile communication network, and a communication control method.

BACKGROUND OF THE INVENTION

In a call under a noisy environment using a communication terminal device, such as a portable telephone set (known also as "MS (mobile station)" or "mobile phone") which is connected to the other party's telephone terminal through a switching center, a telephone network or the like connected, through a wireless line, to a base station constituting a mobile communication system, in some cases, the contents of the other party's speech are hindered by surrounding noise and cannot be heard without difficulties. The realization of a portable telephone set, which can understand the contents of the other party's speech even under a noisy environment and can have a conversation with the other party even under a difficult-to-hear environment, can increase the use range and convenience.

For example, Japanese Patent Laid-Open No. 168552/1999 discloses a portable telephone set provided with voice recognition means for converting voice signals to character data. Specifically, the portable telephone set has a voice memo function, i.e., the function of recording the contents of conversation and the like during a call, and comprises voice recognition means for converting voice data to character data. This portable telephone set is constructed so that data size necessary for a voice memo per call is significantly reduced by writing converted character data in a memory. In the portable telephone set described in Japanese Patent Laid-Open No. 168552/1999, in order to effectively utilize the memory for a voice memo, voice data are converted to character data which are then stored in the memory. That is, this portable telephone set lacks in means for permitting the user to immediately output the other party's speech.

SUMMARY OF THE INVENTION

Accordingly, it is an object of the invention to provide a terminal device, which can clearly learn the contents of the other party's speech through the utilization of voice recognition and can have a conversation with the other party, for example, even under a difficult-to-hear environment, and a communication control method.

The above object can be attained by the following features of the invention.

(1) A terminal device as a first communication party's terminal comprising: voice recognition means which, during a communication connection to a second communication party's terminal, when the mode is set to a voice recognition mode receives, as digital voice signals, the second communication party's voice sent from the second communication party's terminal and performs voice recognition to convert the digital voice signals to text data; and control means for performing control in such a manner that the text data converted by the voice recognition means are output from output means.

(2) The terminal device according to the above item (1), wherein the output means comprises display means and the text data are displayed on the display means.

(3) The terminal device according to the above item (1) or (2), wherein the output means comprises means for sending the text data output from the voice recognition means to the second communication party's terminal.

(4) A terminal device as a first communication party's terminal comprising: voice recognition means for performing voice recognition of voice signals from a second communication party's terminal to convert the voice signals to text data; and means for sending the text data as a result of the voice recognition to the second communication party's terminal.

(5) A terminal device as a second communication party's terminal device for a communication connection to the terminal device according to the above item (4), said second communication party's terminal device comprising: means for receiving the text data sent from the terminal device according to the above item (4) and for performing control in such a manner that the received text data are displayed on display means.

(6) A terminal device as a first communication party's terminal comprising: voice recognition means for performing voice recognition of voice signals from a second communication party's terminal to convert the voice signals to text data; means for sending the text data as a result of the voice recognition to the second communication party's terminal; and means for taking the text data out of the signals sent from the second communication party's terminal and for performing control in such a manner that the text data are displayed on display means.

(7) The terminal device according to the above item (6), which further comprises means for multiplexing the text data as a result of the voice recognition with signals to be sent to the second communication party's terminal and sending the multiplexed signals to the second communication party's terminal.

(8) The terminal device according to the above item (6), which further comprises means for multiplexing the text data as a result of the voice recognition with picture information to be sent to the second communication party's terminal and for sending the multiplexed signals to the second communication party's terminal.

(9) The terminal device according to any one of the above items (1), (4), and (6) wherein the voice recognition means receives, as input data, digital voice signals obtained by demodulating the second communication party's voice, sent from the second communication party's terminal, in demodulation means and expanding the demodulated signals in expansion means and performs the voice recognition.

(10) A terminal device as a first communication party's terminal comprising: voice compression means for compressing voice signals, which have been input through voice input means and converted to digital signals, and for outputting the compressed signals: modulation means for modulating the compressed signals output from the voice compression means to produce modulated signals which are then output; radio transmission means for receiving and wirelessly transmitting the modulated signals output from the modulation means; demodulation means for demodulating signals received in radio reception means to produce demodulated signals which are then output; voice expansion means for receiving and expanding the signals demodulated in the demodulation means to produce expanded digital voice signals which are then output; voice recognition means for subjecting the digital voice signals output from the voice expansion means to voice recognition to convert the digital voice signals to text data which are then output; voice output means for receiving and outputting analog voice signals converted from the digital voice signals output from the voice expansion means; and control means for performing control in such a manner that, when the mode is set to a voice recognition mode, the digital voice signals, which have been expanded in the voice expansion means, are input into the voice recognition means and are subjected to voice recognition and text data output from the voice recognition means are sent to and are displayed on display means.

(11) A terminal device as a first communication party's terminal comprising: voice recognition means for performing voice recognition of input voice signals to convert the voice signals to text data which are then output; first multiplexing means for permitting the input of the text data as a result of the voice recognition output from the voice recognition means and picture information, which has been input through picture input means and converted to digital signals, and for multiplexing them to produce multiplexed signals which are then output; picture compression means for receiving and compressing the signals output from the first multiplexing means to produce compressed picture signals which are then output; voice compression means for compressing voice signals, which have been input through voice input means and converted to digital signals, to produce compressed voice signals which are then output; second multiplexing means for permitting the input of the signals output from the picture compression means and the signals output from the voice compression means and for multiplexing them to produce multiplexed signals which are then output; modulation means for modulating the signals output from the second multiplexing means to produce modulated signals which are then output, radio transmission means for receiving and wirelessly transmitting the signals output from the modulation means; demodulation means for demodulating signals received in radio reception means to produce demodulated signals which are then output; separation means for permitting the input of the signals demodulated in the demodulation means and for separating the input signals into picture signals and voice signals which are then output; picture expansion means for receiving and expanding the picture signals separated in the separation means to produce expanded picture signals which are then output; voice expansion means for receiving and expanding the voice signals separated in the separation means to produce expanded digital voice signals which are then output; display means for receiving and displaying analog signals converted from the digital picture signals output from the picture expansion means; voice output means for receiving and outputting analog voice signals converted from the digital voice signals output from the voice expansion means; and control means for performing control in such a manner that, when the mode is set to a voice recognition mode, the digital voice signals, which have been expanded in the voice expansion means, are input into the voice recognition means and are subjected to voice recognition and text data output from the voice recognition means are sent to the first multiplexing means.

(12) The terminal device according to the above item (11), wherein the control means comprises means for performing control in such a manner that the text data output from the voice recognition means are sent to and displayed on display means.

(13) A terminal device as a first communication party's terminal comprising: voice recognition means for performing the recognition of voice input by a user through voice input means to convert the voice to text data; and means for sending the text data as a result of the voice recognition to a second communication party's terminal device.

(14) The terminal device according to the above item (13), wherein the text data as a result of the voice recognition are displayed on display means.

(15) A terminal device as a second communication party's terminal device for a communication connection to the terminal device according to the above item (13) or (14), said second communication party's terminal device comprising: means for performing control in such a manner that text data are extracted from the signals sent from the terminal device according to the above item (13) or (14) and are displayed on display means.

(16) The terminal device according to the above item (13) or (14), which further comprises means for multiplexing the text data as a result of the voice recognition with voice signals to be sent to the second communication party's terminal device or picture signals to be sent to the second communication party's terminal device to produce multiplexed signals which are then sent to the second communication party's terminal device.

(17) A terminal device as a first communication party's terminal comprising: voice compression means for compressing voice signals, which have been input through voice input means and converted to digital signals, to produce compressed signals which are then output; voice recognition means for performing voice recognition of the voice signals, which have been input through the voice input means and converted to digital signals, to convert the voice signals to text data which are then output; first modulation means for modulating the signals output from the voice compression means to produce modulated voice signals which are then output; second modulation means for modulating input text data to produce modulated text data which are then output; multiplexing means for receiving the signals output from the first modulation means and the signals output from the second modulation means and multiplexing them to produce multiplexed signals which are then output; radio transmission means for receiving and wirelessly transmitting the signals output from the multiplexing means; separation means for separating signals received in radio reception means into text signals and voice signals which are then output; first demodulation means for receiving and demodulating the voice signals separated in the separation means to produce voice signals which are then output; second demodulation means for receiving and demodulating the text signals separated in the separation means to produce text data which are then output; voice expansion means for receiving and expanding the signals output from the first demodulation means to produce digital voice signals which are then output; and voice output means for receiving and outputting analog voice signals converted from the digital voice signals expanded in the voice expansion means, wherein said second demodulation means transfers the demodulated text data to the control means, said control means receives the text data demodulated in the second demodulation means, displays the text data on display means, and further sends the text data to the second modulation means, and said control means receives the text data from the voice recognition means and performs control in such a manner that the text data are sent to the second modulation means.

(18) A terminal device as a first communication party's terminal comprising: voice compression means for compressing voice signals, which have been input through voice input means and converted to digital signals, to produce compressed signals which are then output: voice recognition means for performing voice recognition of the voice signals, which have been input through the voice input means and converted to digital signals, to convert the voice signals to text data which are then output; first multiplexing means for permitting the input of the text data and picture information, which has been input through picture input means and converted to digital signals, and for multiplexing them to produce multiplexed signals which are then output; picture compression means for receiving and compressing the signals output from the first multiplexing means to produce compressed picture signals which are then output; second multiplexing means for permitting the input of the signals output from the picture compression means and the signals output from the voice compression means and for multiplexing them to produce multiplexed signals which are then output; modulation means for modulating the signals output from the second multiplexing means to produce modulated signals which are then output; radio transmission means for receiving and wirelessly transmitting the signals output from the modulation means; demodulation means for demodulating signals received in radio reception means to produce demodulated signals which are then output; separation means for permitting the input of the signals demodulated in the demodulation means and for separating the input signals into picture signals and voice signals which are then output; picture expansion means for receiving and expanding the picture signals separated in the separation means to produce expanded digital picture signals which are then output; voice expansion means for receiving and expanding the voice signals separated in the separation means to produce expanded digital voice signals which are then output; display means for receiving and displaying analog picture signals converted from the digital picture signals expanded in the picture expansion means; voice output means for receiving and outputting analog voice signals converted from the digital voice signals expanded in the voice expansion means; control means for performing control in such a manner that, when the mode is set to a voice recognition mode, the text data output as a result of the voice recognition in the voice recognition means are sent to the first multiplexing means.

(19) The terminal device according to the above item (18), wherein the control means sends the text data to display means to display the text data on the display means.

(20) The terminal device according to any one of the above items (1), (4), (6), (10), (11), (13), (17), and (18), which further comprises an operation key for an instruction on the start of voice recognition and means for, upon predetermined operation of the operation key, starting the conversion of the voice to text data by the voice recognition means.

(21) The terminal device according to any one of the above items (1), (4), (6), (10), (11), (13), (17) and (18), which further comprises means for, when the status of predetermined signals to be monitored satisfies predetermined requirements, starting the conversion of the voice to text data by the voices recognition means.

(22) A communication system comprising a communication network for transmitting voice signals which one terminal sends to or receives from another terminal, said communication network having thereon at least one node comprising means for receiving the voice signals to be transmitted and performing voice recognition to convert the voice signals to text data, said converted text data being transmitted from said one node on the communication network to the voice signal receiver's terminal or both the voice signal receiver's terminal and the voice signal sender's terminal.

(23) The communication system according to the above item (22), wherein means for performing voice recognition of voice signals to convert the voice signals to text data is provided in the voice signal receiver's terminal or both the voice signal receiver's terminal and the voice signal sender's terminal, and the voice recognition is carried out on the communication network side based on the load state of the voice signal receiver's terminal and/or the voice signal sender's terminal, or upon a request from the voice signal receiver's terminal and/or the voice signal sender's terminal.

(24) The terminal device according to any one of the above items (1), (4), (10), (11), (13), (17), and (18), wherein the terminal devices are mobile stations for radio communication with base stations.

(25) The communication system according to-the above item (22) or (23), wherein the terminals connected to the communication network are mobile stations for radio communication with base stations.

(26) The terminal device according to any one of the above items (1), (4), (6), (10), (11), (13), (17), and (18), which are separable into a first unit comprising voice input means and voice output means and a second unit comprising display means.

(27) A communication control method comprising the steps of: receiving, in a first terminal in a plurality of terminals which are in communication connection with each other, digital voice signals obtained by demodulating and expanding the voice of a second communication party sent from the second communication party's terminal, and performing voice recognition of the digital voice signals to convert the digital voice signals to text data; and outputting the text data from output means in said first terminal.

(28) The communication control method according to the above item (27), wherein the text data are displayed on a display unit constituting the output means in said one terminal.

(29) The communication control method according to the above item (27) or (28), which comprises the step of transmitting the text data from said first terminal to said second terminal and wherein the results of voice recognition of said second communication party's speech are returned to said second communication party.

(30) The communication control method according to the above item (27) or (28), which comprises the step of displaying the text data, sent from said first terminal, on a display unit in said second terminal.

(31) The communication control method according to the above item (27), wherein control is performed in such a manner that, upon predetermined operation of a predetermined operation key on said one terminal or when predetermined signals to be monitored satisfy predetermined requirements, in said first terminal, voice recognition of said second party's speech to convert the voice signals to text data is started.

(32) A communication control method comprising the steps of: performing, in a first terminal, voice recognition of voice signals sent from a second communication party's terminal, which is in communication connection to said first terminal, to convert the voice signals to text data; sending the text data, as a result of the voice recognition, from said first terminal to said another communication party's terminal; and performing, in said first terminal, control in such a manner that the text data as a result of the voice recognition of the voice signals sent from said second communication party's terminal are displayed on display means.

(33) The communication control method according to the above item (32), wherein said terminals each are a terminal having a portable videotelephone function, and said first terminal multiplexes the text data as a result of the voice recognition with picture information to be sent to said second communication party's terminal and sends the multiplexed signals to said second communication party's terminal.

(34) A communication control method comprising the steps of: performing voice recognition of voice input by a user through a first terminal to convert the voice signals to text data; and sending the text data as a result of the voice recognition to a second communication party's terminal.

(35) The communication control method according to the above item (34), wherein the text data as a result of the voice recognition are displayed on a display unit in said first terminal.

(36) The communication control method according to the above item (34) or (35), wherein, in the second communication party's terminal, the text data sent from said first terminal are displayed on a display unit.

(37) The communication control method according to the above item (34) or (35), which comprises the step of multiplexing, in said first terminal, the text data as the results of the voice recognition with voice signals or picture signals to be transmitted to the second communication party's terminal and transmitting the multiplexed signals to the second communication party's terminal.

(38) A communication control method comprising the steps of: receiving, in a voice recognition device provided in a communication network between a sender's terminal for transmitting at least talker's voice signals and a receiver's terminal, the voice signals, and performing voice recognition to convert the voice signals to text data; and transmitting the text data converted in the voice recognition device provided on the communication network to the receiver's terminal or both the receiver's terminal and the sender's terminal.

BRIEF DESCRIPTION OF THE DRAWINGS

The invention will be explained in more detail in conjunction with the appended drawings, wherein:

FIGS. 8A and 8B are diagrams showing the appearance of the portable telephone set in the third preferred embodiment of the invention;

DESCRIPTION OF THE PREFERRED EMBODIMENTS

Figure 1:
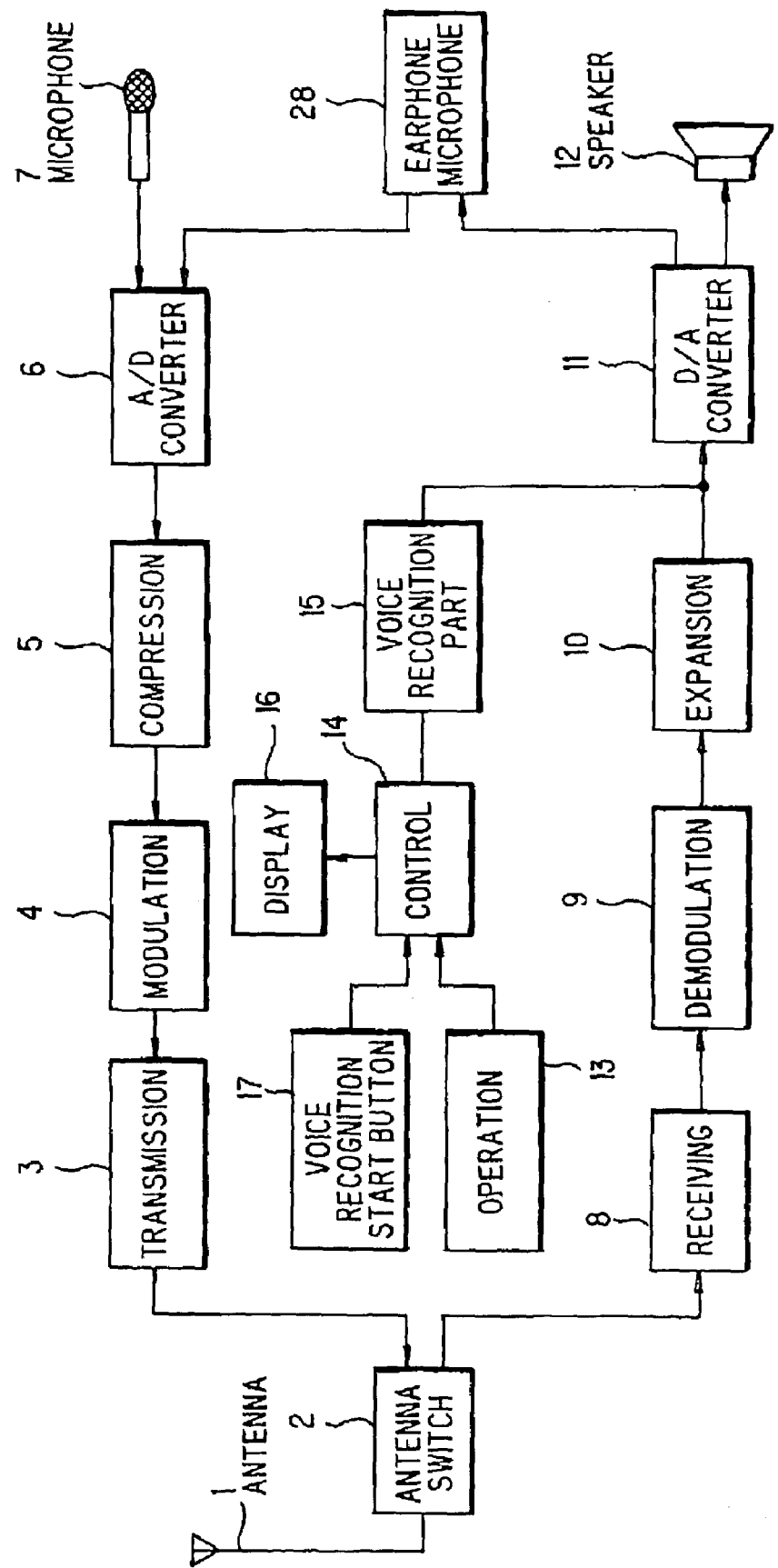
FIG. 1 is a diagram showing the construction of a portable telephone set in a first preferred embodiment of the invention.

The preferred embodiments of the invention will be explained in conjunction with the accompanying drawings. FIG. 1 shows a preferred embodiment of the terminal device according to the invention. The terminal device shown in FIG. 1 comprises: voice recognition means (15) which, at the time of communication connection to the other communication party's terminal (hereinafter often referred to simply as "the other party's terminal"), receives digital voice signals obtained by demodulating and expanding, respectively in a demodulation circuit and an expansion circuit, the other party's voice signals received by a receiving circuit and performs voice recognition to convert voice data to text data; and control means (14) which receives the text data output from the voice recognition means (15) and sends the text data to display means (16) where the text data are displayed.

More specifically, a preferred embodiment of the terminal device according to the invention shown in FIG. 1 comprises: voice compression means (5) for compressing voice signals, which have been received from voice input means (7 and 28 in FIG. 1) and has been converted to digital signals, and outputting the compressed voice signals; modulation means (4) for modulating signals output from the voice compression means (5) and outputting the modulated signals; radio transmission means (3, 2, 1) for receiving signals output from the modulation means and tirelessly transmitting the signals; demodulation means (9) for demodulating signals received in radio receiving means (1, 2, 8) and outputting the demodulated signals; voice expansion means (10) for receiving the signals demodulated by the demodulation means (9), expanding the received signals, and outputting digital voice signals; voice recognition means (15) for performing voice recognition of the digital voice signals output from the voice expansion means (10), converting the digital voice signals to text data, and outputting the text data; voice output means (12, 28) for receiving signals obtained by converting the digital voice signals output from the voice expansion means (10) to analog signals and outputting voice; and control means (14) for performing control in such a manner that, when the status of setting is a voice recognition mode, the digital voice signals expanded in the voice expansion means (10) are input into the voice recognition means (15) for voice recognition, and the text data output from the voice recognition means (15) are sent to the display means (16) to display the data.

The terminal device in this preferred embodiment of the invention may have a voice recognition start button (17) as an operation key. Upon the depression of the voice recognition start button (17), the control means (14) performs control so that, from a point of time when this button has been depressed, the voice recognition means (15) performs voice recognition of the other party's speech and begins to convert the digital voice signals to text data.

Alternatively, in the terminal device in this preferred embodiment of the invention, a construction may be adopted wherein the level of surrounding noise is monitored and, when the noise level has been judged to exceed a predetermined threshold, voice recognition processing by the voice recognition means (15) is automatically activated.

Figure 3:
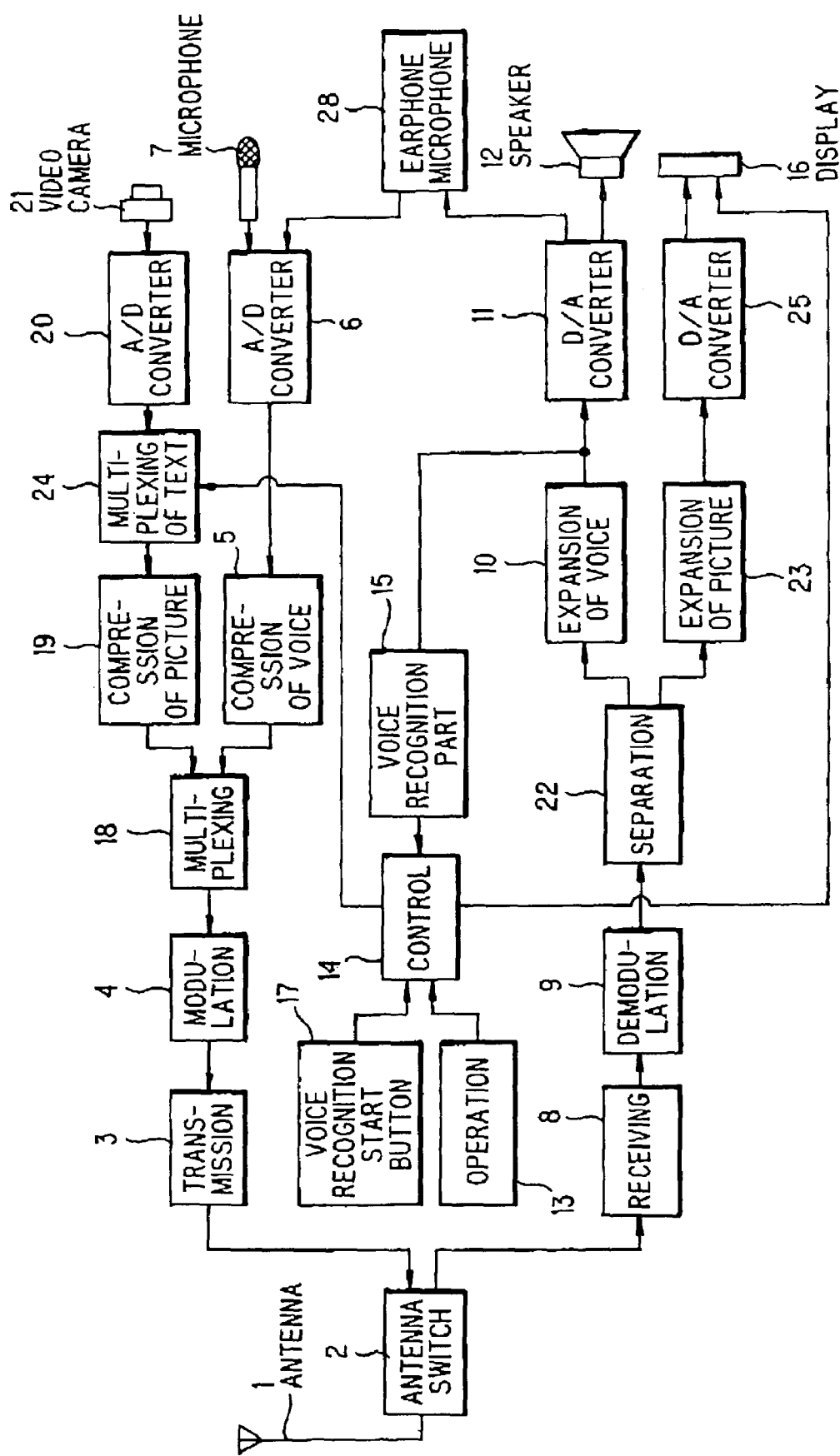
FIG. 3 is a diagram showing the construction of a portable telephone set in a second preferred embodiment of the invention.

Further, the terminal device in this preferred embodiment of the invention may have a construction as shown in FIG. 3, wherein the voice recognition means (15) for performing voice recognition of the other party's speech and converting the voice signals to text data and means (14, 24) for transmitting, as text data, the results of voice recognition of the other party's speech to the other party's terminal are provided and, in the other party's terminal which has received the text data, the text data are displayed on the display means (16). When the terminal device in this preferred embodiment of the invention has a portable TV phone (videotelephone) function, the text data as the results of the voice recognition are sent, to the other party's terminal, in the state of multiplexing with picture information to be transmitted to the other party's terminal.

More specifically, FIG. 3 shows a second preferred embodiment of the terminal device according to the invention. This terminal device comprises: voice recognition means (15) for performing voice recognition of input voice signals, converting the voice signals to text data, and outputting the text data; first multiplexing means (24) for permitting the input of the text data as the result of voice recognition and picture information which has been received from picture input means (21) and has been converted to digital signals by first analog-to-digital conversion (A/D conversion) means (20), multiplexing them, and outputting the multiplexed signals; picture compression means (19) for receiving the multiplexed data output from the first multiplexing means (24) and compressing the data; voice compression means (5) for compressing voice signals which have been received from voice input means (7, 28) and have been converted to digital signals in second analog-to-digital conversion (A/D conversion) means (6); second multiplexing means (18) for permitting the input of the compressed data output from the picture compression means (19) and the compressed data output from the voice compression means (5), multiplexing them, and outputting the multiplexed signals; modulation means (4) for modulating the multiplexed signals output from the second multiplexing means (18); radio transmission means (3, 2, 1) for receiving the signals output from the modulation means (4) and wirelessly transmitting the signals: demodulation means (9) for demodulating the signals received in radio receiving means (1, 2, 8); separation means (22) for permitting the input of the signals demodulated by the demodulation means (9), separating the signals into picture signals and voice signals, and outputting these separated signals; picture expansion means (23) for receiving the picture signals separated in the separation means (22), expanding the picture signals, and outputting the expanded signals; voice expansion means (10) for receiving the voice signals separated in the separation means (22), expanding the voice signals, and outputting the expanded signals; first digital-to-analog conversion (D/A conversion) means (25) for converting the digital picture signals expanded in the picture expansion means (23) to analog picture signals; display means (16) for displaying the analog picture signals from the first D/A conversion means (25); second digital-to-analog conversion (D/A conversion) means (11) for converting the digital voice signals expanded in the voice expansion means (10) to analog voice signals; voice output means (12, 28) for outputting the analog voice signals received from the second D/A conversion means (11); and control means (14) for performing control in such a manner that when the status of setting is a voice recognition mode, the digital voice signals expanded in the voice expansion means (10) are input into the voice recognition means (15) for voice recognition, and the text data output from the voice recognition means (15) are sent to the first multiplexing means (24). Also, in this preferred embodiment, upon the depression of a voice recognition start button (17), the voice recognition means (15) performs voice recognition.

Figure 7:
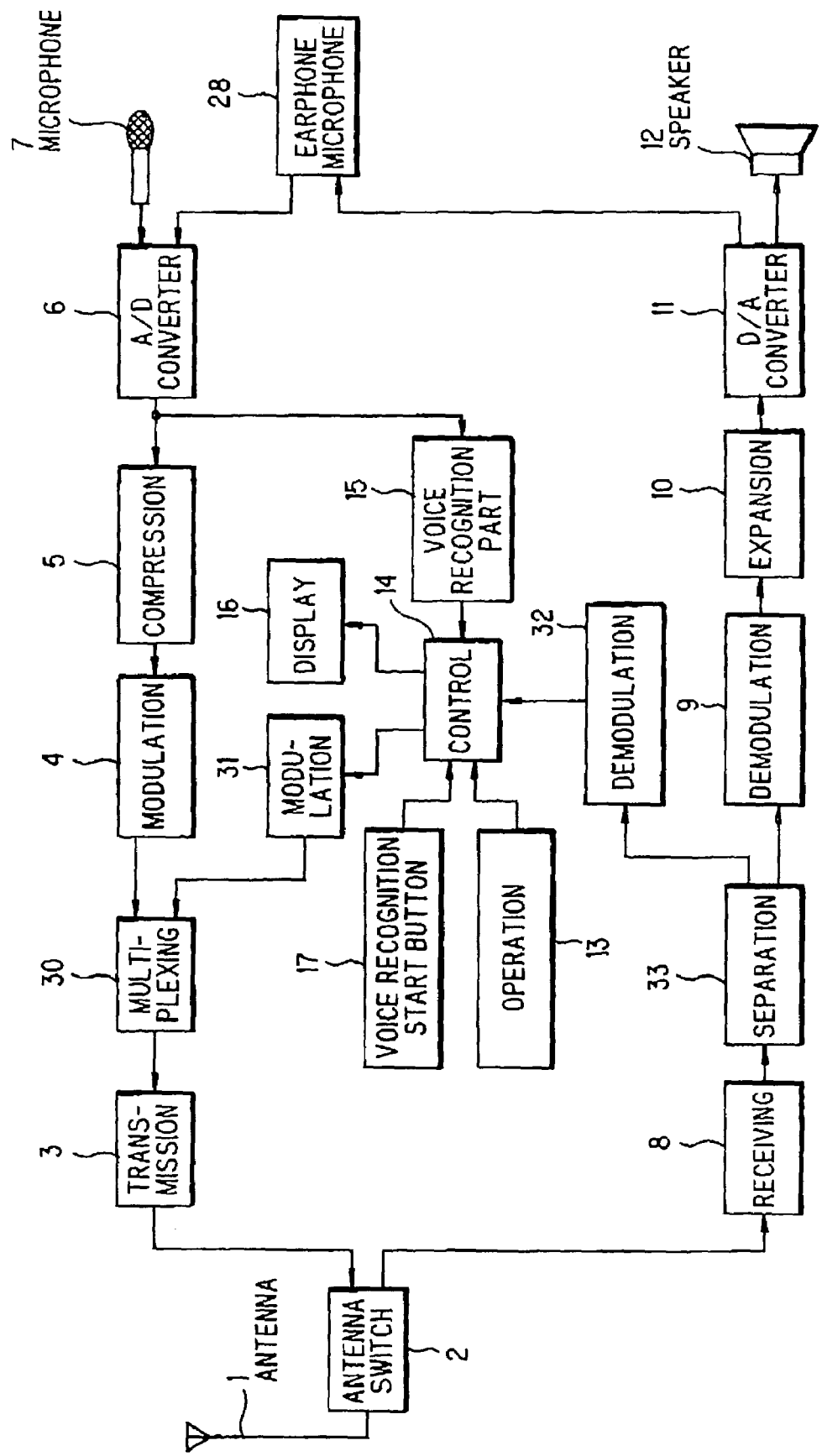
FIG. 7 is a diagram showing the construction of a portable telephone set in a third preferred embodiment of the invention.

FIG. 7 shows a third preferred embodiment of the terminal device according to the invention. The terminal device comprises: voice compression means (5) for compressing voice signals, which have been received from voice input means (7, 28) and have been converted to digital signals in analog-to-digital conversion (A/D conversion) means (6), and outputting the compressed signals; voice recognition means (15) for performing voice recognition of the voice signals, converted to the digital signals in the A/D conversion means (6), and converting the digital data to text data, and outputting the text data; first modulation means (4) for modulating the output of the voice compression means (5); second modulation means (31) for modulating the text data; multiplexing means (30) for receiving the modulated signals output from the first modulation means (4) and the modulated signals output from the second modulation means (31) and multiplexing these modulated signals; radio transmission means (3, 2, 1) for receiving the multiplexed signals output from the multiplexing means (30) and wirelessly transmitting the multiplexed signals; separation means (33) for separating the signals received in radio receiving means (1, 2, 8) into text data and voice signals; first demodulation means (9) for receiving the voice signals separated in the separation means (33) and demodulating the voice signals: second demodulation means (32) for receiving the text data separated in the separation means (33) and demodulating the text data; voice expansion means (10) for expanding the demodulated signals output from the first demodulation means and outputting the expanded signals; digital-to-analog conversion (D/A conversion) means (11) for converting the digital voice signals expanded in the voice expansion means (10) to analog signals; and voice output means (12, 28) for permitting the input of the analog signals and outputting the analog signals, wherein the second demodulation means (32) transfers the demodulated text data to control means (14) and the control means (14) receives the text data demodulated in the second demodulation means (32) and performs control in such a manner that the text data are displayed on display means (16) and are transferred to the second modulation means (31) and the text data from the voice recognition means (15) are sent to the second modulation means (31).

Figure 10:
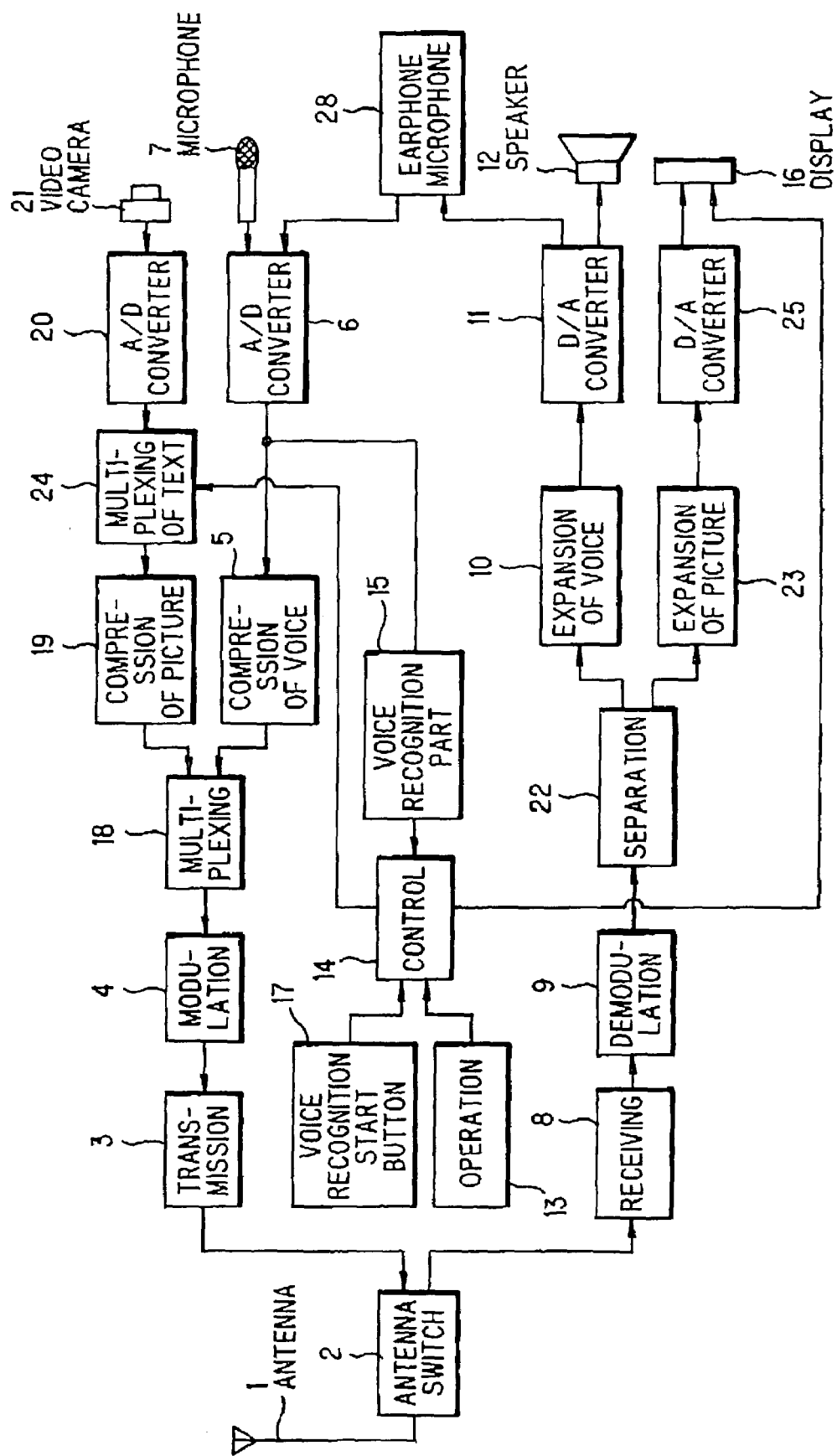
FIG. 10 is a diagram showing the construction of a portable telephone set in a fourth preferred embodiment of the invention.

FIG. 10 shows a fourth preferred embodiment of the terminal device according to the invention. This terminal device comprises: voice compression means (5) for compressing voice signals, which have been received from voice input means (7, 28) and have been converted to digital signals in analog-to-digital conversion (A/D conversion) means (6), and outputting the compressed signals; voice recognition means (15) for performing voice recognition of the voice signals converted to the digital signals, converting the digital signals to text data, and outputting the text data; first multiplexing means (24) for permitting the input of the text data and picture information, which has been received from picture input means (21) and has been converted to digital signals in analog-to-digital conversion (A/D conversion) means (20), multiplexing the text data and the picture information, and outputting the multiplexed signals; picture compression means (19) for receiving the multiplexed signals output from the first multiplexing means (24), compressing the multiplexed signals, and outputting the compressed signals; second multiplexing means (18) for permitting the input of the output of the picture compression means and the output of the voice compression means, multiplexing these outputs, and outputting the multiplexed signals; modulation means (4) for modulating the multiplexed signals output from the second multiplexing means (18); radio transmission means (3, 2, 1) for receiving the modulated signals output from the modulation means (4) and wirelessly transmitting the modulated signals; demodulation means (9) for demodulating signals received in radio receiving means (1, 2, 8); separation means (22) for permitting the input of the signals demodulated in the demodulation means (9), separating the input signals into picture signals and voice signals, and outputting the separated signals; picture expansion means (23) for receiving the picture signals separated in the separation means (22), expanding the picture signals, and outputting the expanded picture signals; voice expansion means (10) for receiving the voice signals separated in the separation means (22), expanding the voice signals, and outputting the expanded voice signals; digital-to-analog conversion (D/A conversion) means (25) for converting the digital picture signals expanded in the picture expansion means (23) to analog picture signals; display means (16) for permitting the input of the analog picture signals and displaying the analog picture signals; digital-to-analog conversion (D/A conversion) means (11) for converting the digital voice signals expanded in the voice expansion means to analog voice signals; voice output means (12) for permitting the input of the analog voice signals and outputting the analog voice signals; and control means (14) for performing control in such a manner that, when the status of setting is a voice recognition mode, the text data, which have been input into the voice recognition means (15) for voice recognition, are input and transferred to the first multiplexing means (24). The control means (14) further outputs the text data to the display means (16).

Figure 13:
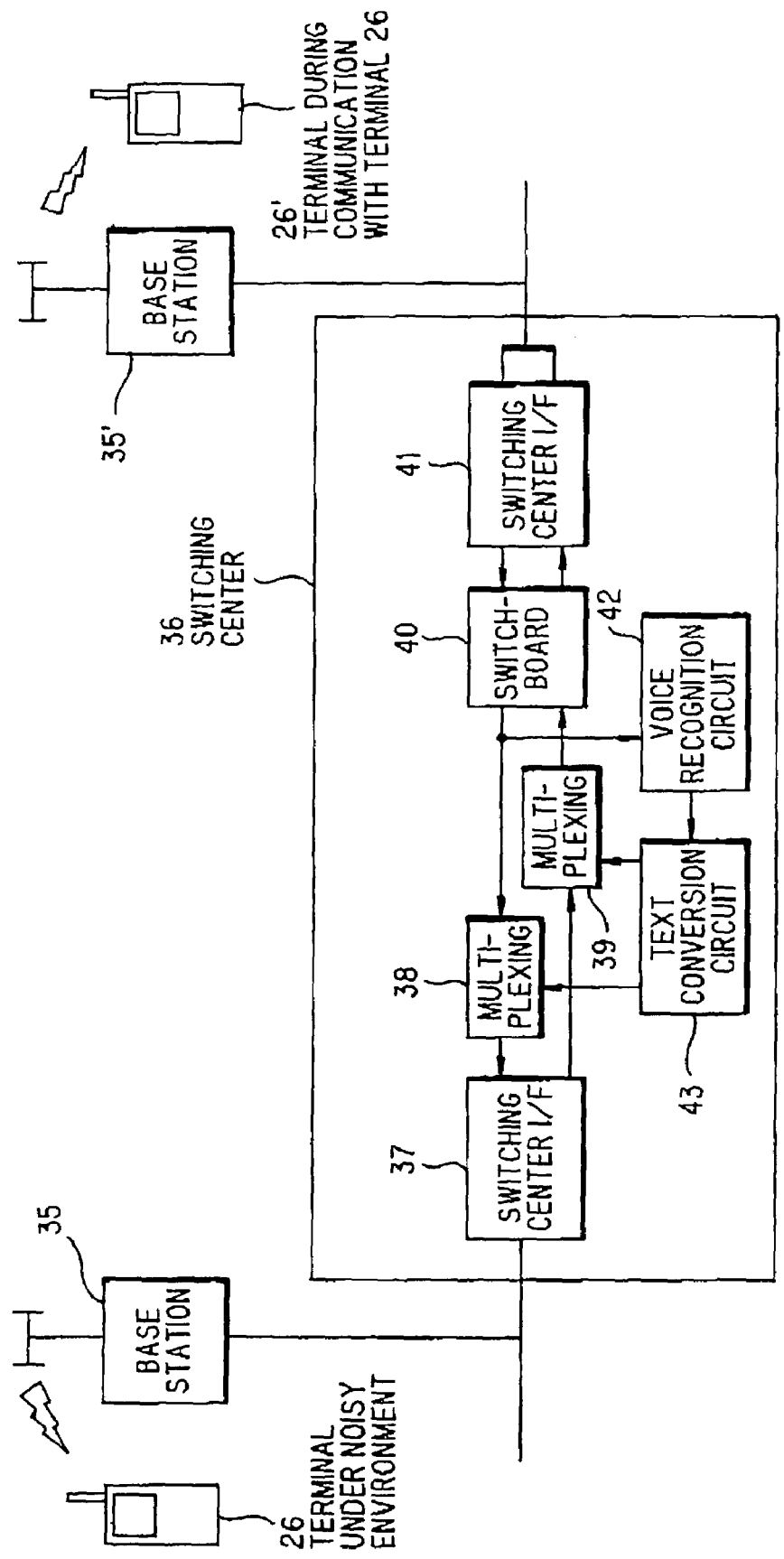
FIG. 13 is a diagram showing the construction of a switching center in a fifth preferred embodiment of the invention.

FIG. 13 shows a switching center (36) in a fifth preferred embodiment of the invention. This switching center (36) constitutes one node on a communication network and comprises means (42, 43, 38, 39) for permitting the input of voice signals during speech communication connection, performing voice recognition, multiplexing text data as the result of voice recognition with the voice signals, and transmitting the multiplexed signals to a voice signal receiver's terminal and a voice signal sender's terminal. Alternatively, a construction may be adopted wherein switching control is carried out in such a manner that, the voice recognition is carried out on the terminal side and, according to the residual amount of the battery or the condition of load of the terminal, or upon a request from the terminal, the voice recognition is carried out on the communication network.

Preferred embodiments of the communication control method according to the invention will be explained. In one preferred embodiment, the communication control method comprises the following steps.

Step 1: One (first terminal) of a plurality of terminals connected to each other for communication receives digital voice signals obtained by demodulating and expanding the voice of the other party (a second party) of the communication transmitted from the second party's terminal, performs voice recognition, and converts the voice signals to text data.

Step 2: In the one terminal, the text data are displayed on a display unit.

The following step 3 may be additionally provided.

Step 3: The first terminal transmits the text data to the second party's terminal. Consequently, the results of voice recognition of the second party's speech are returned to the second party, and the second party can confirm the contents of the speech on the terminal.

Another preferred embodiment of the communication control method according to the invention comprises the following steps.

Step 1: Voice input by the user through the user's terminal (first terminal) is subjected to voice recognition and is converted to text data.

Step 2: The text data as the results of voice recognition is sent to the second party's terminal which is in connection to the user's terminal.

In this preferred embodiment of the communication control method of the invention, the text data as the results of voice recognition are displayed on a display unit of the user's terminal. On the other hand, in the second party's terminal, the text data sent from the user's terminal are displayed on a display unit. Further, the text data as the result of voice recognition are multiplexed with voice signals or picture signals to be sent to the second party's terminal, followed by transmission to the second party's terminal.

The preferred embodiments of the invention will be explained in more detail in conjunction with the accompanying drawings. In the preferred embodiments, a portable telephone set is used as the terminal device by way of example. FIG. 1 is a diagram showing the construction of the first preferred embodiment of the invention.

With reference now to FIG. 1, a portable telephone set as a first preferred embodiment of the invention comprises, an antenna 1 for both transmission and reception; an antenna switch 2 for switching between transmission signals and reception signals; a microphone 7 for inputting voice signals to be transmitted; an A/D converter 6 for converting analog voice signals from the microphone 7 to digital voice signals; a voice compression circuit 5 for compressing the digital voice signals output from the A/D converter 6; a modulation circuit 4 for subjecting the transmission signals output from the voice compression circuit 5 to QPSK (quadrature phase shift keying) modulation; and a transmitter 3 for converting the transmission signals output from the modulation circuit 4 to transmission frequency. The portable telephone set in the first preferred embodiment of the invention further comprises: a receiving circuit 8 for performing the amplification of received radio waves and frequency tuning detection; a demodulation circuit 9 for subjecting the signals from the receiving circuit 8 to QPSK demodulation; a voice expansion circuit 10 for expanding the compressed voice signals output from the demodulation circuit 9; a D/A converter 11 for converting the digital received voice signals output from the voice expansion circuit 10 to analog voice signals; a speaker 12 for receiving the analog voice signals output from the D/A converter 11 and outputting voice signals; a voice recognition circuit 15 for permitting the input of the signals (the digital received voice signals from the other party) expanded from the voice expansion circuit 10, performing voice recognition, and converting the expanded signals to text data; a display unit 16 for displaying characters or images sent from the control unit 14, such as LCD (liquid crystal display); a control unit 14 for performing the whole control; an operating part 13 with a key, a button or the like; a voice recognition start button 17 for starting voice recognition; and an earphone microphone 28 for the user who wears it for conversation when surrounding noise is large. In the following preferred embodiments, the voice recognition circuit 15 comprises a conventional voice recognition engine, which extracts the voice feature quantity and matches the voice feature quantity with a dictionary, and has a construction which can cope with a specific talker or an unspecific talker.

Figure 2:
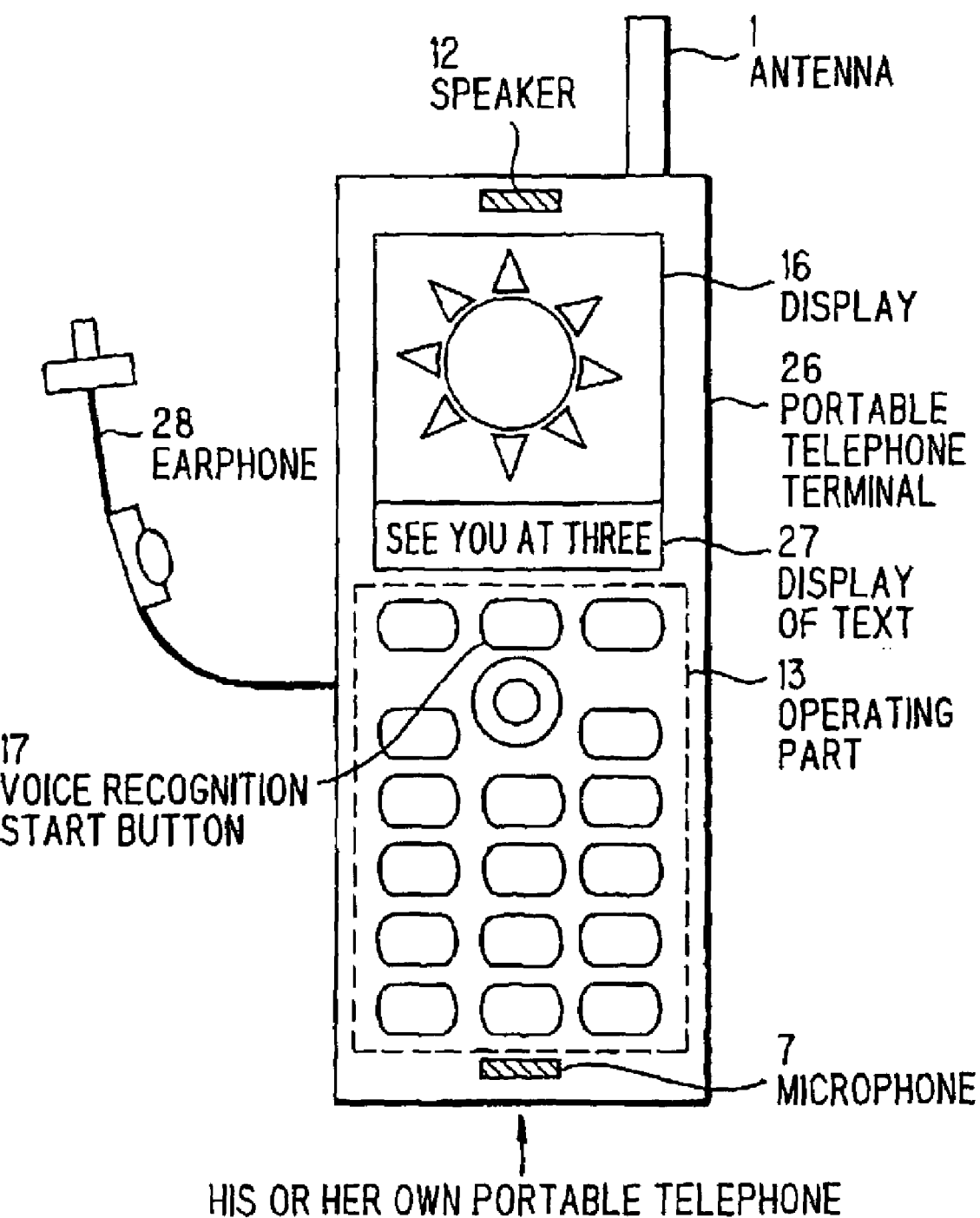
FIG. 2 is a diagram showing the appearance of the portable telephone set in the first preferred embodiment of the invention.

FIG. 2 is a front view showing the appearance of the portable telephone set according to the first preferred embodiment of the invention. In FIG. 2, the portable telephone set is a portable telephone terminal 26 for a talker who talks, for example, in a noisy environment. The reference characters in FIG. 2 correspond to those in FIG. 1, and numeral 1 designates an antenna for both transmission and reception, numeral 7 a microphone, numeral 12 a speaker, numeral 13 an operating part, numeral 16 a display unit, numeral 17 a voice recognition start button, and numeral 28 a earphone. In this terminal, the other party's voice signals are converted by voice recognition to text data which are then displayed on the display unit 16 as indicated by numeral 27 "SEE YOU AT THREE."

The operation of the portable telephone set according to the first preferred embodiment of the invention will be explained. At the outset, the transmission operation of the portable telephone set according to the first preferred embodiment of the invention will be explained. It is assumed that a speech channel is established between this portable telephone set and a mobile switching center through a base station and a base station control station and is further in communication connection to a connection destination. In FIG. 1, analog voice signals from the microphone 7 and the earphone microphone 28 are converted to digital voice signals by an A/D converter 6, are subjected to band compression in a voice compression circuit 5, are subjected to QPSK modulation in a modulation circuit 4, are converted and amplified to transmission frequency in a transmission circuit 3, are passed through an antenna switch 2, and are wirelessly transmitted through an antenna part 1.

Next, the reception operation of the portable telephone set according to the first preferred embodiment of the invention will be explained. The communication radio wave received in the antenna 1 is passed through the antenna switch 2 and is input into the reception circuit 8, where the received radio wave is subjected to amplification and frequency tuning, and the modulation signals taken out of the reception circuit 8 is transmitted to the demodulation circuit 9.

The digital voice signals subjected to QPSK demodulation in the demodulation circuit 9 are expanded in the expansion circuit 10, are converted to analog voice signals in the D/A converter 11, and are output from the speaker 12.

Figure 5:
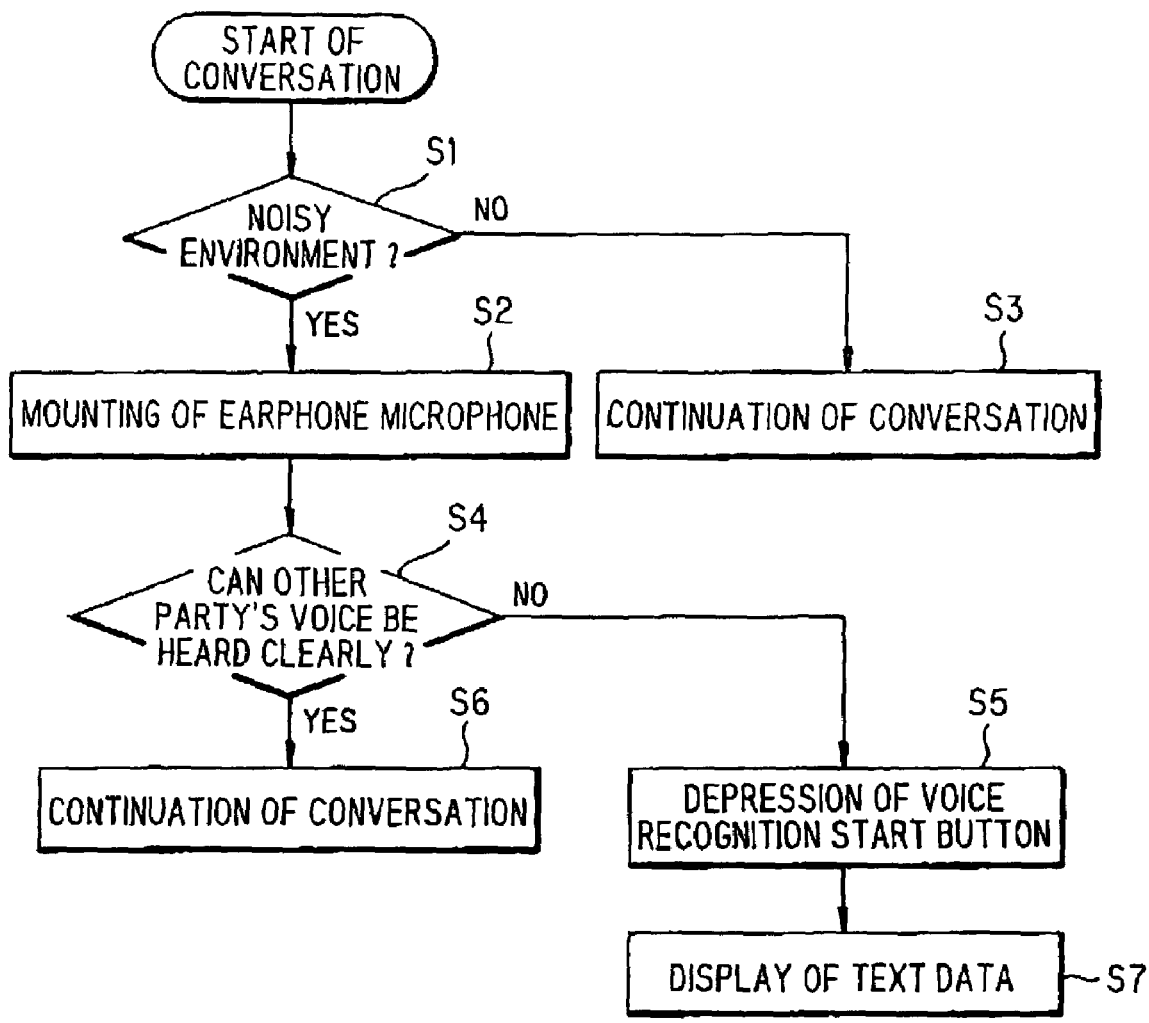
FIG. 5 is a flow diagram illustrating the operation of the portable telephone set in the first preferred embodiment of the invention.

FIG. 5 is a flow chart showing the operation from the start of conversation in the case where voice recognition is carried out using the portable telephone set according to the first preferred embodiment of the invention. Processing for voice recognition in the portable telephone set according to the first preferred embodiment of the invention will be explained in conjunction with FIGS. 1 and 5. Upon the start of conversation, the talker makes a judgment on whether or not the surrounding environment is noisy (step S1). When the surrounding environment is not noisy and the other party's voice can be clearly heard, in this state, the talker continues the conversation (step S3).

On the other hand, when the result of the judgment is that the surrounding environment is noisy, the talker wears the earphone microphone 28 (step S2). In this state, when the talker can clearly hear the other party's voice, the conversation is continued (step S6).

On the other hand, when the talker cannot clearly hear the other party's voice even in such a state that the earphone microphone 28 is worn, the talker depresses the voice recognition start button 17 (step S5). In this case, the voice recognition part 15 starts the recognition of the other party's voice, and the results of recognition are displayed as text display 27 on the screen of the display unit 16 in the portable telephone set (step S7).

At that time, the other party's speech data are received in the reception circuit 8 and are subjected to QPSK demodulation in the demodulation circuit 9, the demodulated data are then subjected to band expansion in the expansion circuit 10, and the expanded digital voice data are input into the voice recognition part 15 where voice recognition processing is carried out. The results of voice recognition are displayed, by the control unit 14, as text data indicated by numeral 27 in FIG. 2, on the screen of the display unit 16.

Instead of a manual operation wherein, upon the depression of the voice recognition start button 17, the voice recognition is started in the voice recognition part 15, a construction may be adopted wherein automatic control is carried out in such a manner that the noise level of the surrounding environment and the like are monitored in the inside of the portable telephone set and are compared with a predetermined threshold and, when the noise level exceeds the threshold, the voice recognition in the voice recognition part 15 and the display of the text data are carried out. Alternatively, a construction may be adopted wherein the wearing of the earphone microphone is detected and the voice recognition in the voice recognition part 15 and the display of the text data are carried out.

The text may be displayed in one line of the display unit 16 in a lateral scroll manner, or alternatively may be displayed over a plurality of lines on a predetermined window in the display screen in a vertical scroll manner.

Further, for example, a function may be provided wherein text data as a result of voice recognition are stored in a memory (not shown) and are later transmitted through e-mail (electronic mail).

Next, the portable telephone set according to the second preferred embodiment of the invention will be explained. In the second preferred embodiment of the invention, a portable TV phone using voice recognition is realized which is usable under a noisy environment. FIG. 3 is a diagram showing the construction of the portable telephone set according to the second preferred embodiment of the invention, and FIG. 4 a front view showing the appearance of the portable telephone set.

With reference now to FIG. 3, a portable TV phone set as the second preferred embodiment of the invention comprises: an antenna 1 for both transmission and reception; an antenna switch 2 for switching between transmission signals and reception signals; a camera 21 for photographing a picture to be transmitted; an A/D converter 20 for converting analog picture signals sent from the camera 21 to digital signals; a multiplexing circuit 24 for superimposing text data produced as a result of voice recognition on the picture signals (for example, for superimposing the text data on video signals at predetermined timing (position and size on the screen)); a picture compression circuit 19 for compressing the digital picture signals output from the A/D converter 20; a microphone 7 for inputting voice signals to be transmitted; an A/D converter 6 for converting analog voice signals from the microphone 7 and an earphone microphone 28 to digital voice signals; a voice compression circuit 5 for compressing the digital voice signals output from the A/D converter 6; a multiplexing circuit 18 for multiplexing the picture signals from the picture compression circuit 19 with the voice signals from the voice compression circuit 5; a modulation circuit 4 for subjecting the transmission signals output from the multiplexing circuit 18 to QPSK modulation; and a transmission circuit 3 for converting the transmission signals output from the modulation circuit 4 to transmission frequency.

The portable TV phone set in the second preferred embodiment of the invention further comprises: a receiving circuit 8 for performing the amplification of received radio waves and frequency tuning detection; a demodulation circuit 9 for subjecting the signals from the receiving circuit 8 to QPSK demodulation; a separation circuit 22 for permitting the input of the signals demodulated in the demodulation circuit 9 and separating the signals into voice signals and picture signals; a voice expansion circuit 10 for expanding the compressed voice signals separated in the separation circuit 22; a D/A converter 11 for converting the digitized received voice signals output from the voice expansion circuit 10 to analog voice signals; a speaker 12 for outputting the voice signals; a picture expansion circuit 23 for expanding the compressed picture signals separated in the separation circuit 22; a D/A converter 25 for converting the digitized received picture signals output from the picture expansion circuit 23 to analog picture signals; a display unit 16 for displaying a received picture or characters and pictures sent from the control unit 14; a control unit 14 for controlling the whole portable TV phone set; an operating circuit 13 for the portable telephone; a voice recognition circuit 15 for performing voice recognition of digital voice signals from the other party to convert the digital voice signals to text data; and a voice recognition start button 17 for starting voice recognition.

Figure 4:
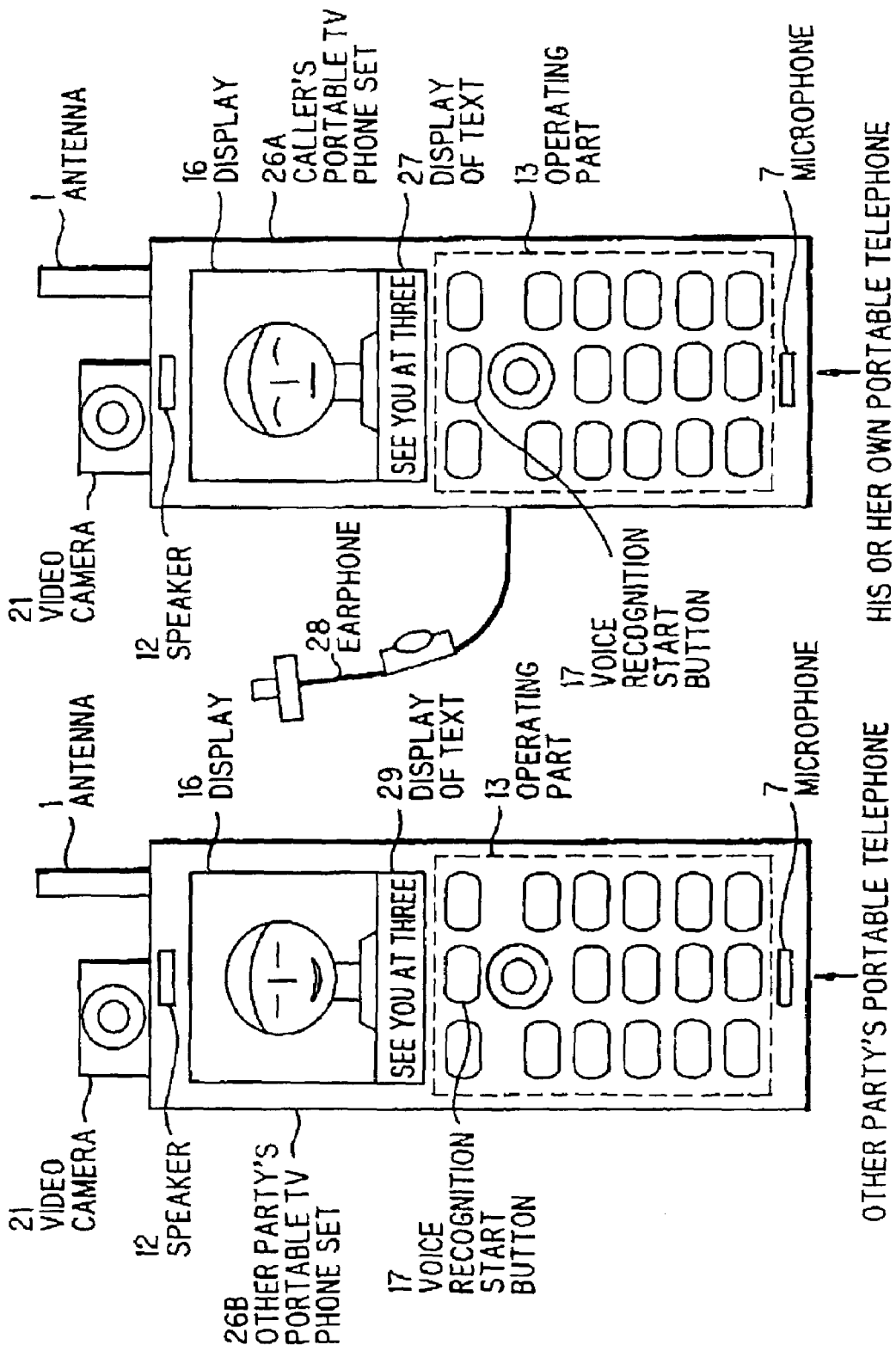
FIGS. 4A and 4B are diagrams showing the appearance of the portable telephone set in the second preferred embodiment of the invention.

FIG. 4 shows a talker's portable TV phone set 26A under a noisy environment (see FIG. 4B) and the other party's portable TV phone set 26B (see FIG. 4A) according to the second preferred embodiment of the invention. In the portable TV phone set 26A, the other party's voice signals are converted by voice recognition to text data which are displayed on the display unit 16 as indicated by numeral 27 and, at the same time, are transmitted to the other party's portable TV phone set 26B where the text data are also displayed on the display unit 16 in the other party's TV phone set 26B as indicated by numeral 29.

The operation of the portable TV phone set according to the second preferred embodiment of the invention will be explained in conjunction with FIG. 3. The operation of transmission in the portable TV phone set in the second preferred embodiment of the invention is carried out as follows. Analog voice signals from the microphone 7 or the earphone microphone 28 are converted by the A/D converter 6 to digital signals which are then subjected to band compression in the voice compression circuit 5. Signals of analog pictures photographed by the video camera 21 are converted by the A/D converter 20 to digital signals which are then subjected to band compression in the picture compression circuit 19. The band compressed picture signals are multiplexed with the compressed voice signals in the multiplexing circuit 18, followed by transmission through the same path as described above in connection with the above preferred embodiment wherein only voice communication is used.

The operation of the reception of the portable TV phone set in the second preferred embodiment of the invention will be explained. The received voice signals are passed through the receiving circuit 9, the demodulation circuit 9, and the separation circuit 22 and are separated in the separation circuit 22 into voice signals and picture signals. The voice signals separated in the separation circuit 22 are expanded in the voice expansion circuit 10 and are converted, in the D/A converter 11, to analog voice signals which are output from the speaker 12.

The picture signals, which have been compressed at the time of transmission and have been separated from the voice signals in the separation circuit 22, are expanded in the picture expansion circuit 23.

The digital picture signals expanded in the picture expansion circuit 23 are converted to analog picture signals in the D/A converter 25, and the analog picture signals are displayed on the display unit 16.

Figure 6:
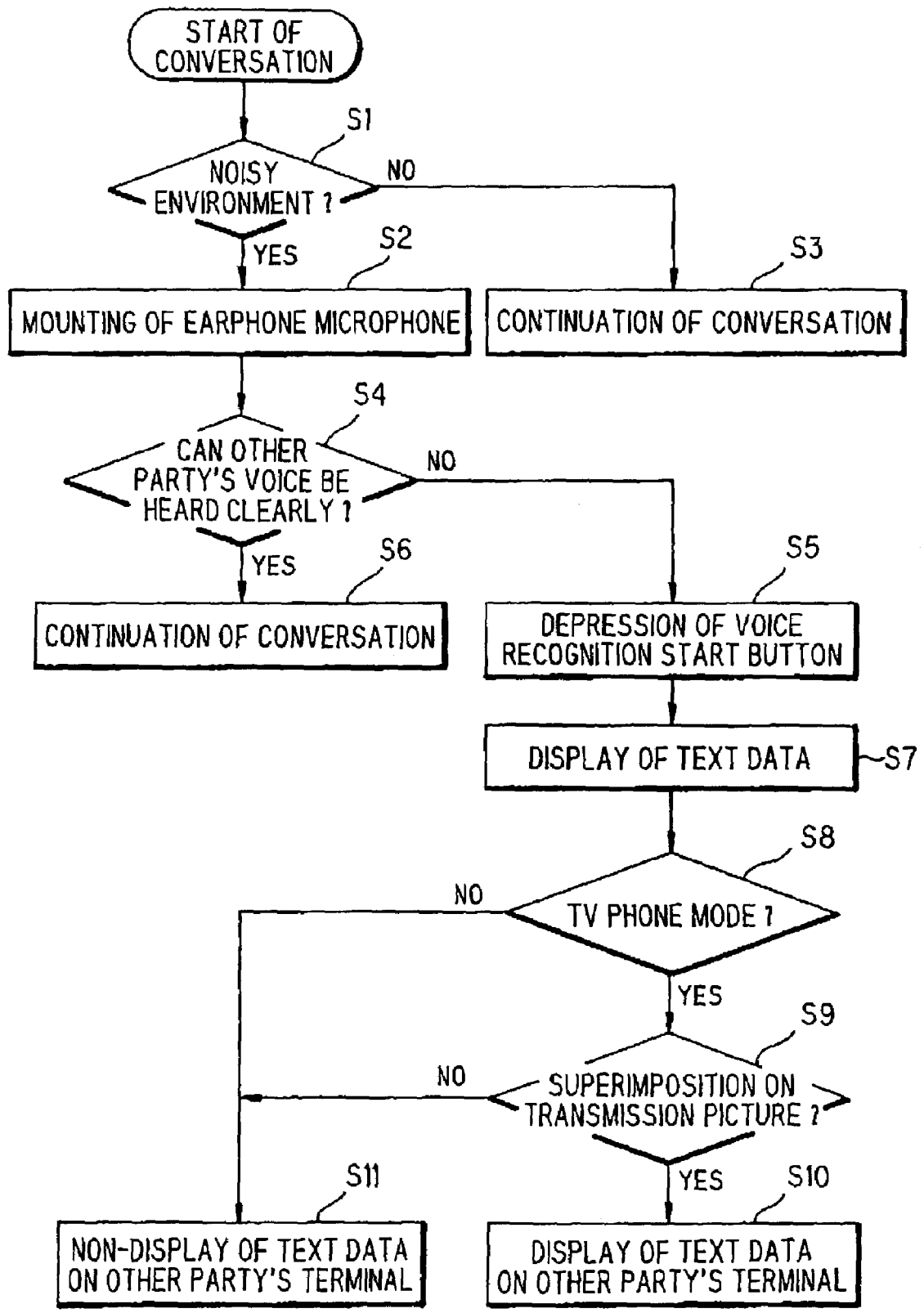
FIG. 6 is a flow diagram illustrating the operation of the portable telephone set in the second preferred embodiment of the invention.

FIG. 6 is a flow chart showing the operation from the start of the communication of the portable TV phone set in the second preferred embodiment of the invention. The operation of the second preferred embodiment of the invention will be explained in conjunction with FIGS. 3, 4, and 6. Upon the initiation of the communication, the talker makes a judgment on whether or not the surrounding environment is noisy (step S1 in FIG. 6). When the result of the judgment is that the surrounding environment is not noisy and the other party's voice can be clearly heard, the conversation is continued in this state (step S3). On the other hand, when the result of the judgment is that the surrounding environment is noisy, the talker wears the earphone microphone 28 (step S2). When the wearing of the earphone microphone 28 has permitted the other party's voice to be clearly heard, the conversation is continued in this state (step S6).

When the other party's voice cannot be clearly heard even after the talker wore the earphone microphone 28 (branching to NO in step S4), the voice recognition start button 17 is depressed (step S5). This leads to the start of the recognition of the other party's voice, and the results of the voice recognition are displayed as text display 27 on the display unit 16 of the portable telephone set 26 (step S7).

The other party's communication data are received in the reception circuit 8 and are then subjected to QPSK demodulation in the demodulation circuit 9. The demodulated signals are then subjected to band expansion in the expansion circuit 10, and the expanded digital voice data are subjected to voice recognition processing in the voice recognition part 15. The results are displayed on the display unit 16, by the control unit 14, as text as indicated by numeral 27 in FIG. 4B.

In the case where the mode is set to a TV phone mode (branching to YES in step S8) and the text is superimposed on a transmission picture (branching to YES in step S9), a picture is photographed through the control unit 14 by the video camera 21. The picture signals are converted by the A/D converter 20 to digital signals, and the voice recognized text signals are superimposed on the digitized picture signals in the text multiplexing circuit 24.

The picture signals, on which the text signals have been superimposed, are transmitted to the other party's portable telephone set and displayed as indicated by numeral 29 in FIG. 4A (step S10). When the mode is not set to the TV phone mode (branching to NO in step S9) or when the mode is set to the TV phone mode but the text signals are not superimposed on the transmission picture (branching to NO in step S9), the superimposition of the text signals on the picture signals and the transmission of the superimposed signals to the other party's portable telephone set are not carried out (step S11).

In the above preferred embodiment, it is a matter of course that control may be performed so that, as soon as the voice recognition start button 17 is depressed again, the voice recognition function is stopped.

The function and effect of the first and second preferred embodiments of the invention will be explained.

In the first and second preferred embodiments of the invention, voice recognition means is provided which converts the other party's voice signals transmitted through a digital mobile communication network to text data. The other party's voice is transmitted as compressed and coded digital data. Therefore, there is no need to perform analog-to-digital data conversion, and the compressed and coded digital data as such may be subjected to voice recognition and converted to text data.

Display of text data, converted from the voice signals to text data by voice recognition means, by display means permits the use of the displayed data as auxiliary data for understanding the contents of the other party's speech. This can realize conversation even in a noisy environment.

An operation key is provided which, upon the control of an operation key during the conversation, the conversion of the other party's speech to text data is started by voice recognition. By virtue of this, during the conversation in a noisy environment, when the contents of other party's speech cannot be clearly understood, the voice recognition can be easily started by keying.

In the above preferred embodiments, when the other party's speech is converted by voice recognition to text data which are then displayed on the display unit, in the conversation in a noisy environment, the speech portion, which is difficult to be understood, can be viewed as the display of voice recognized text. This can facilitate the understanding of the contents of the other party's speech. This text display function can also improve the convenience of the portable telephone set for handicapped people who suffer from hearing loss or hearing difficulties.

In the preferred embodiments, the construction is that the other party's speech is converted by voice recognition to text data which are then also transmitted to the other party side and can be displayed on the other party's terminal display unit. The talker under a noisy environment can perform voice recognition of the other party's speech displayed on the talker's portable telephone set can transmit text data after conversion to the other party's telephone, and can display the text data on the other party's display unit, while the other party side can confirm the contents of the his or her own speech through the contents of the text obtained by conversion.

For example, in a television meeting using portable TV phone sets, text data as the results of the recognition of the other party's voice may be stored in a memory (not shown), and, thereafter, the stored data may be utilized as a part of the official record of the meeting. This text data may be distributed through e-mail.

The text data as a result of voice recognition transmitted to the other communication party are multiplexed with voice information, picture information, etc., and the multiplexed signals are transferred through an information channel (TCH). In the case of the text data as the result of voice recognition, for example, the data capacity (number of bytes) of one character of Japanese (for example, JIS) is as small as 2 bytes, and the data capacity of one alphameric character is as small as one byte. That is, the data capacity is so small that there is no possibility that information to be originally transferred through the information channel is pressed. The text data produced by the voice recognition may be added to and transmitted through a control channel (CCH) or the like among radio channels between the base station and the portable telephone set.

Next, the third preferred embodiment of the invention will be explained. In the first and second preferred embodiments, the voice recognition of the received voice is carried out on the portable telephone set side under a noisy environment. On the other hand, the voice, which has been input through the talker's terminal on the transmitter's side, is recognized, and text data produced as a result of voice recognition are sent through a control channel or after multiplexing with voice signals to a portable telephone under a noisy environment and are displayed.

FIG. 7 is a diagram showing the construction of the third preferred embodiment of the invention. With reference now to FIG. 7, the portable telephone set constituting the third preferred embodiment of the invention comprises: an antenna 1 for both transmission and reception; an antenna switch 2 for switching between transmission signals and received signals; a microphone 7 for permitting the input of voice signals to be transmitted: an A/D converter 6 for converting the analog voice signals from the microphone 7 to digital voice signals; a voice compression circuit 5 for compressing the digital voice signals output from the A/D converter 6; a modulation circuit 4 for subjecting the transmission signals output from the voice compression circuit 5, for example, to QPSK modulation; a modulation circuit 31 for receiving text data output from a control unit 14 and modulating the received text data; a multiplexing circuit 30 for permitting the input of signals from the modulation circuit 4 and the text modulated signals output from the modulation circuit 31 and multiplexing and outputting these data; and a transmitter 3 for converting the transmission signals output from the multiplexing circuit 30 to transmission frequency.

The portable telephone set in this third preferred embodiment further comprises: a reception circuit 8 for performing the amplification of received radio waves and frequency tuning detection; a separation circuit 33 for separating the signals from the reception circuit 8 into voice modulated signals and text modulated signals; a demodulation circuit 9 for subjecting the voice modulated signals separated in the separation circuit 33 to QPSK demodulation; a demodulation circuit 32 for demodulating the text modulated signals separated in the separation circuit 33; a voice expansion circuit 10 for expanding the compressed voice signals output from the demodulation circuit 9: a D/A converter 11 for converting the digital received voice signals output from the voice expansion circuit 10 to analog voice signals; a speaker 12 for receiving the analog signals output from the D/A converter 11 and outputting the voice signals; a voice recognition circuit 15 for permitting the input of the digital voice signals output from the A/D converter 6 and performing voice recognition to convert the digital voice signals to text data; a display unit 16, such as LCD (liquid crystal display), for displaying characters or images from the control unit 14; an operating part 13 having keys, buttons, etc.; a voice recognition start button 17 for starting voice recognition; an earphone microphone 28 for the user to wear it for conversation with the other party; and a control unit 14 for controlling the whole telephone set. The control unit 14 receives the input of the voice recognition start button 17 and the input of the operating part 13. The control unit 14 further receives text data demodulated in the demodulation circuit 32 and performs control in such a manner that the text data are displayed on the display unit 16. Further, the control unit 14 receives the text data, which have been subjected to voice recognition in the voice recognition circuit 15, and sends the data to the display unit 16. Further, the control unit 14 sends the text data, which have been subjected to voice recognition in the voice recognition circuit 15, to the modulation circuit 31.

Figure 9:
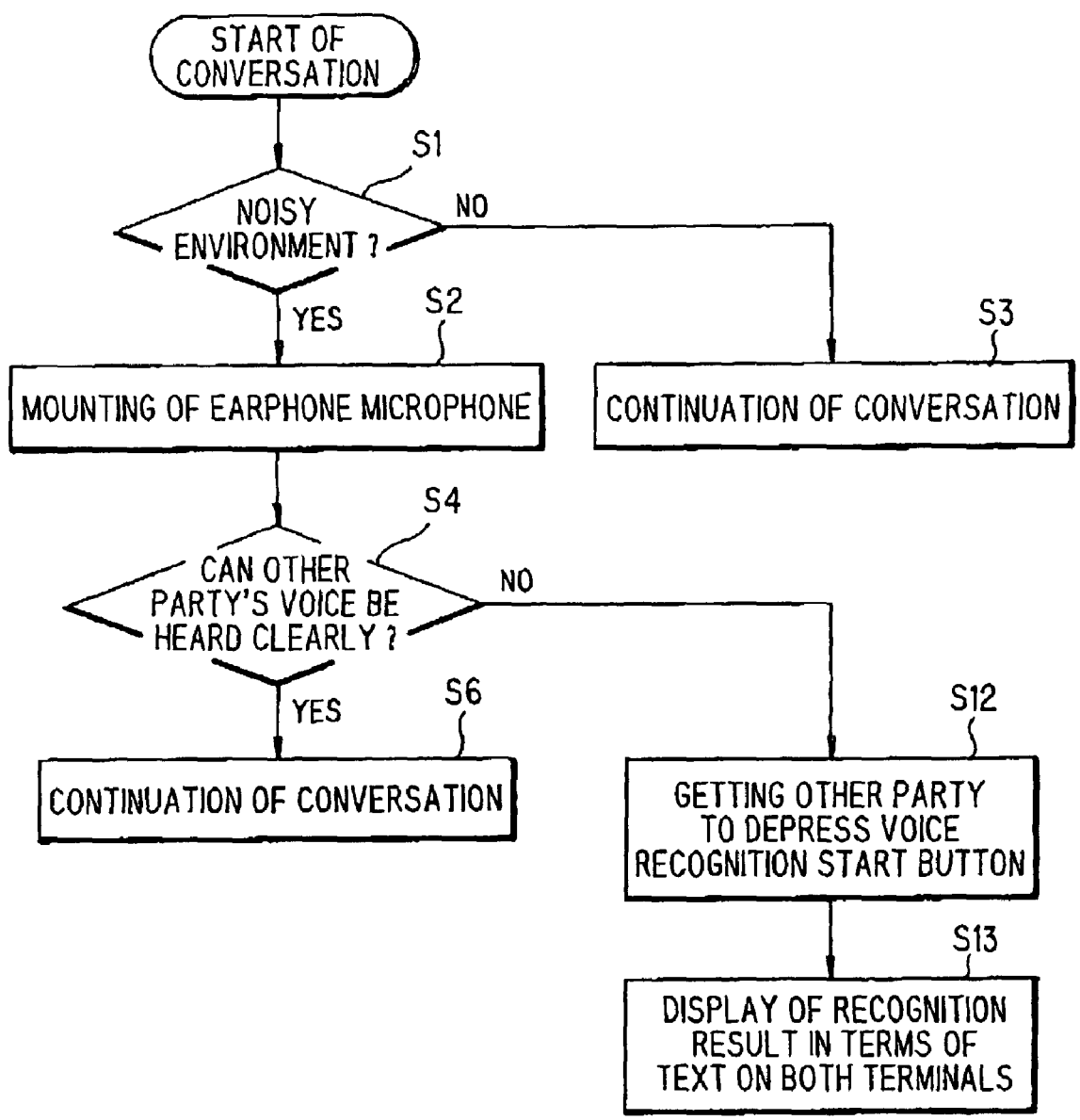
FIG. 9 is a flow diagram illustrating the operation of the portable telephone set in the third preferred embodiment of the invention.

FIG. 8 is a diagram showing the appearance of the portable telephone set in the third preferred embodiment of the invention. In FIG. 8, reference character 26C designates a portable telephone set on a transmitter's side, where the voice introduced through the microphone 7 is subjected to voice recognition and is transmitted, and reference character 26D a portable telephone set which is under a noisy environment, is in conversation through an earphone microphone 28 and displays, on the display unit 16, voice recognized text data from the portable telephone set 26C. In the portable telephone sets shown in FIGS. 8 and 5, like parts are identified with the same reference numerals. FIG. 9 is a flow diagram illustrating the operation of the third preferred embodiment of the invention.

With reference now to FIGS. 7 to 9, when the environment is noisy and the other party's voice cannot be clearly heard in such a state that the earphone microphone 28 has been worn (where step S4 in FIG. 9 is NO), the talker gets the other party to depress the voice recognition start button 17 of the other party's portable telephone set (step S12).

Upon the depression of the voice recognition start button 17 on the other party's terminal side, analog voice signals introduced from the microphone 7 are converted in the A/D converter 6 to digital signals and are then subjected to voice recognition in the voice recognition part 15. Text data produced as a result of voice recognition are passed through the control unit 14 and, as shown in FIG. 8A, in the terminal 26C, are displayed as indicated by numeral 29 on the display unit 16 (step S13).

The text data are modulated in the modulation circuit 31 and are multiplexed with the modulated voice signals in the multiplexing circuit 30. The multiplexed signals are converted to transmission frequency and amplified in the transmission circuit 3, are passed through the antenna switch 2, and are sent through the antenna part 1.

In the terminal under a noisy environment, the communication radio waves received by the antenna 1 are passed through the antenna switch 2 and are input into the reception circuit 8 where the received radio waves are subjected to amplification and frequency tuning. The modulated signals are taken out of the reception circuit 8 and are then separated in the separation circuit 33 into voice modulated signals and text modulated signals. The separated text modulated signals are demodulated in the demodulation circuit 32 to text data, and, as shown in FIG. 8B, in the terminal 26D, the demodulated text data are passed through the control unit 14 and are displayed on the display unit 16 as indicated by numeral 27.

Figure 11:
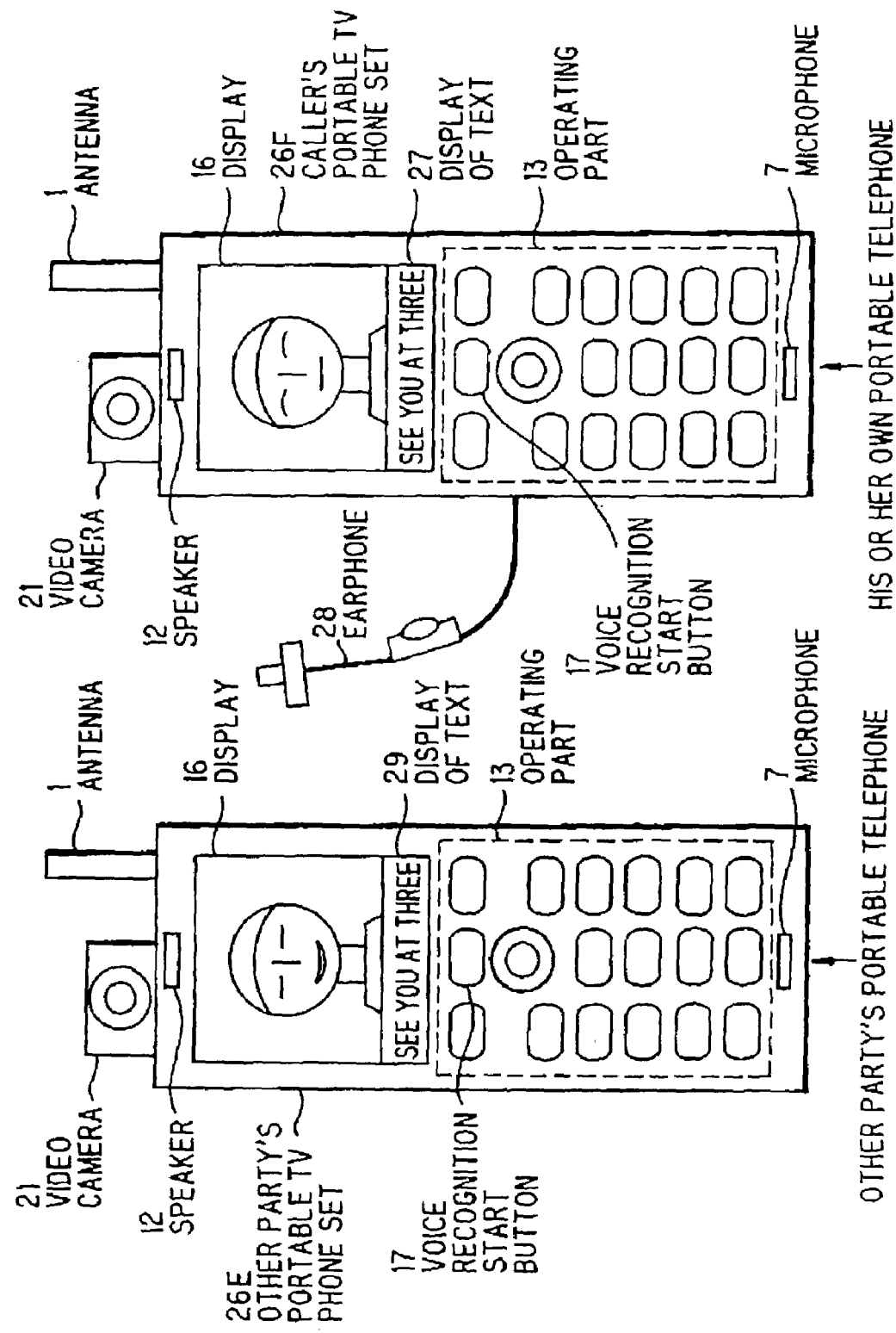
FIGS. 11A and 11B are diagrams showing the construction of a portable telephone set in a fourth preferred embodiment of the invention.

Next, the fourth preferred embodiment of the invention will be explained. In this fourth preferred embodiment, the function of the third preferred embodiment is applied to a portable TV phone. FIG. 10 is a diagram showing the construction of a portable telephone set in the fourth preferred embodiment of the invention, and FIG. 11 a front view showing one embodiment of the appearance of the portable telephone set shown in FIG. 10.

With reference now to FIG. 10, the portable TV phone set constituting the fourth preferred embodiment of the invention comprises: an antenna 1 for both transmission and reception; an antenna switch 2 for switching between transmission signals and reception signals; a video camera 21 for photographing a picture to be transmitted; an A/D converter 20 for converting analog picture signals from the video camera 21 to digital signals; a microphone 7 for permitting the input of voice signals to be transmitted; an A/D converter 6 for converting the analog voice signals from the microphone 7 or the earphone microphone 28 to digital signals; a voice compression circuit 5 for compressing the digital voice signals output from the A/D converter 6; a voice recognition circuit 15 for subjecting the digital voice signals output from the A/D converter 6 to voice recognition to convert the digital voice signals to text data and for sending the text data to the control unit 14; a text multiplexing circuit 24 for superimposing the text data as a result of voice recognition sent from the control unit 14 on the digital picture signals output from the A/D converter 20; a picture compression circuit 19 for compressing the digital picture signals output from the text multiplexing circuit 24; a multiplexing circuit 18 for multiplexing the picture signals from the picture compression circuit 19 with the voice signals from the voice compression circuit 5; a modulation circuit 4 for subjecting the transmission signals output from the multiplexing circuit 18 to QPSK modulation; and a transmission circuit 3 for converting the transmission signals output from the modulation circuit 4 to transmission frequency.

The portable telephone set in the fourth preferred embodiment further comprises: a reception circuit 6 for performing the amplification and frequency tuning detection of received radio waves; a demodulation circuit 9 for subjecting the signals from the reception circuit 8 to QPSK demodulation; a separation circuit 22 for permitting the input of the signals demodulated in the demodulation circuit 9 and for separating the input signals into voice signals and picture signals; a voice expansion circuit 10 for expanding the compressed voice signals separated in the separation circuit 22; a D/A converter 11 for converting the digitized received voice signals output from the voice expansion circuit 10 to analog voice signals; a speaker 12 for outputting the voice signals; a picture expansion circuit 23 for expanding the compressed picture signals separated in the separation circuit 22; a D/A converter 25 for converting the digitized received picture signals output from the picture expansion circuit 23 to analog picture signals; a display unit 16 for displaying the received pictures and the characters and pictures from the control unit 14; a control unit 14 for controlling the whole telephone set; an operating circuit 13 of the portable telephone; and a voice recognition start button 17 for starting voice recognition.

Figure 12:
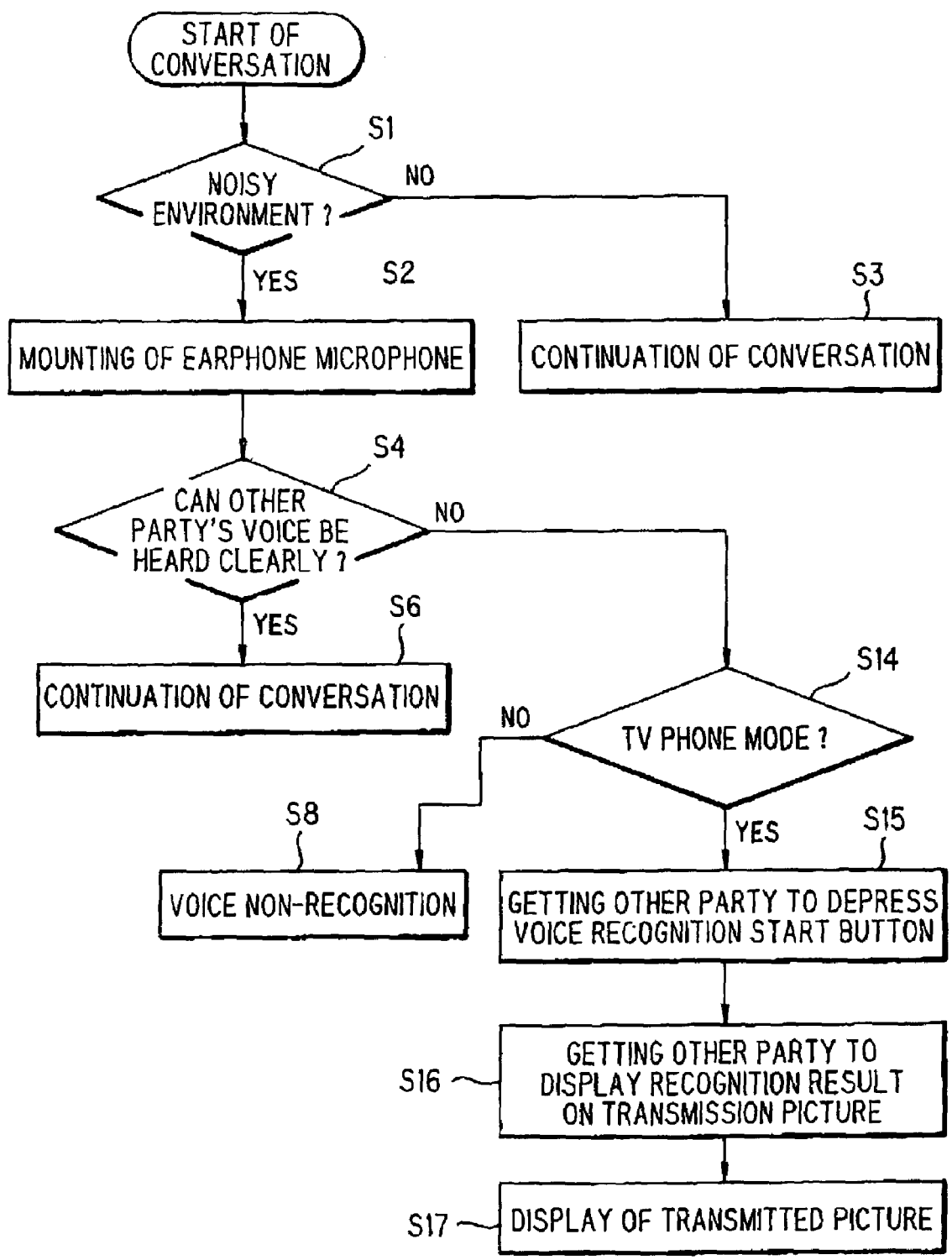
FIG. 12 is a flow diagram illustrating the operation of the portable telephone set in the fourth preferred embodiment of the invention.

FIG. 12 is a flow diagram illustrating the operation of the fourth preferred embodiment of the invention. The operation of the fourth preferred embodiment of the invention will be explained in conjunction with FIGS. 10 to 12. When the other party's voice cannot be clearly heard (where step S4 in FIG. 12 is NO) due to a noisy surrounding environment and, at the same time, the mode is a TV phone mode (YES in step S14), the talker gets the other party to depress the voice recognition start button 17 (step 515).

In the other party's terminal, digital voice signals obtained by converting analog voice signals from the microphone 7 to digital voice signals in the A/D converter 6 are subjected to voice recognition in the voice recognition circuit 15.

In the telephone set 26E shown in FIG. 11A, text data output as a result of the voice recognition are passed through the control unit 14 and are displayed on the display unit 16 as indicated by numeral 29 (step S16). The text data output, as a result of the voice recognition, from the control unit 14 input into the text superimposition circuit 24 where the text data are superimposed on picture signals produced by converting a picture photographed by a video cameral 21 to digital signals in the A/D converter 20. Thereafter, the picture signals, on which the text data have been superimposed, are subjected to band compression in the picture compression circuit 19. The compressed signals are then multiplexed with voice signals in the multiplexing circuit 18, and the multiplexed signals are sent to the other party's terminal.

Next, the operation of the terminal, which receives the signals being transmitted in the state of multiplexing of text data, picture signals, and voice signals on one another, will be explained. The multiplexed signals are passed through the reception circuit 8, the demodulation circuit 9, and the separation circuit 22 where the signals are separated into digital picture signals and voice signals. The picture signals, which have been compressed at the time of transmission, are expanded in the picture expansion circuit 23. The expanded picture signals are converted to analog picture signals in the D/A converter 25 and are displayed on the display unit 16. The text data, which have been multiplexed on the picture signals, are displayed on the display unit 16 in the telephone set 26F shown in FIG. 11B as indicated by numeral 27 (S17 in FIG. 12).

In this preferred embodiment, the construction is that the text data as a result of voice recognition on the talker's side are transmitted to the other party's terminal side. By virtue of this construction, the text data can be displayed on the other party's terminal without undergoing noise in a transmission system or the like.

Next, the fifth preferred embodiment of the invention will be explained. In the above preferred embodiments, the voice recognition has been made on the communication terminal side. However, it is a matter of course that the voice signals may be subjected to voice recognition in a communication network between the terminals. When the start of voice recognition is carried out by an instruction from the communication terminal, a common carrier may perform voice recognition on a full time basis in the communication network. Alternatively, distributed processing may be carried out between the communication terminal and the communication network side.

FIG. 13 shows the fifth preferred embodiment of the invention having a construction such that voice recognition is carried out in a switching center 36. The switching center 36 comprises, from the side of connection to a base station 35, a switching center interface 37, a switchboard 40, and a switching center interface 41. In a path leading from the switchboard 40 to the switching center interface 37 and a path leading from the switching center interface 37 to the switchboard 40, multiplexing circuits 38, 39 are respectively provided for multiplexing text data, obtained by converting, in a text conversion circuit 43, the results of voice recognition in a voice recognition circuit 42, with voice signals.

Voice data from a terminal 26', which is in communication with a terminal 26 under a noisy environment, are switched in the switchboard 40, are then subjected to voice recognition in the voice recognition circuit 42, are converted to text data in the text conversion circuit 43, and are multiplexed with voice signals output from the switchboard 40 in the multiplexing circuit 38.

The voice signals multiplexed with the text data are passed through the switching center interface 37 and are sent to the terminal 26 under a noisy environment, and, in the same manner as described in the first preferred embodiment, the text data are displayed on the display unit in the terminal 26.

In the switching center 36, the text data from the text conversion circuit 43 are superimposed on the voice signals from the terminal 26 under a noisy environment, and the text data are also displayed on the display unit of the terminal 26'. By virtue of this, the talker on the terminal 26' side can also confirm the results of the voice recognition. In this connection, a construction may be adopted wherein the terminal 26 under the noisy environment is the portable telephone set of the first preferred embodiment and, on the switching center 36 side, according to the loaded condition of the terminal 26, or upon a request from the terminal 26, voice recognition is carried out in the voice recognition circuit 42, followed by conversion to text data in the text conversion circuit 43.

Figure 14:
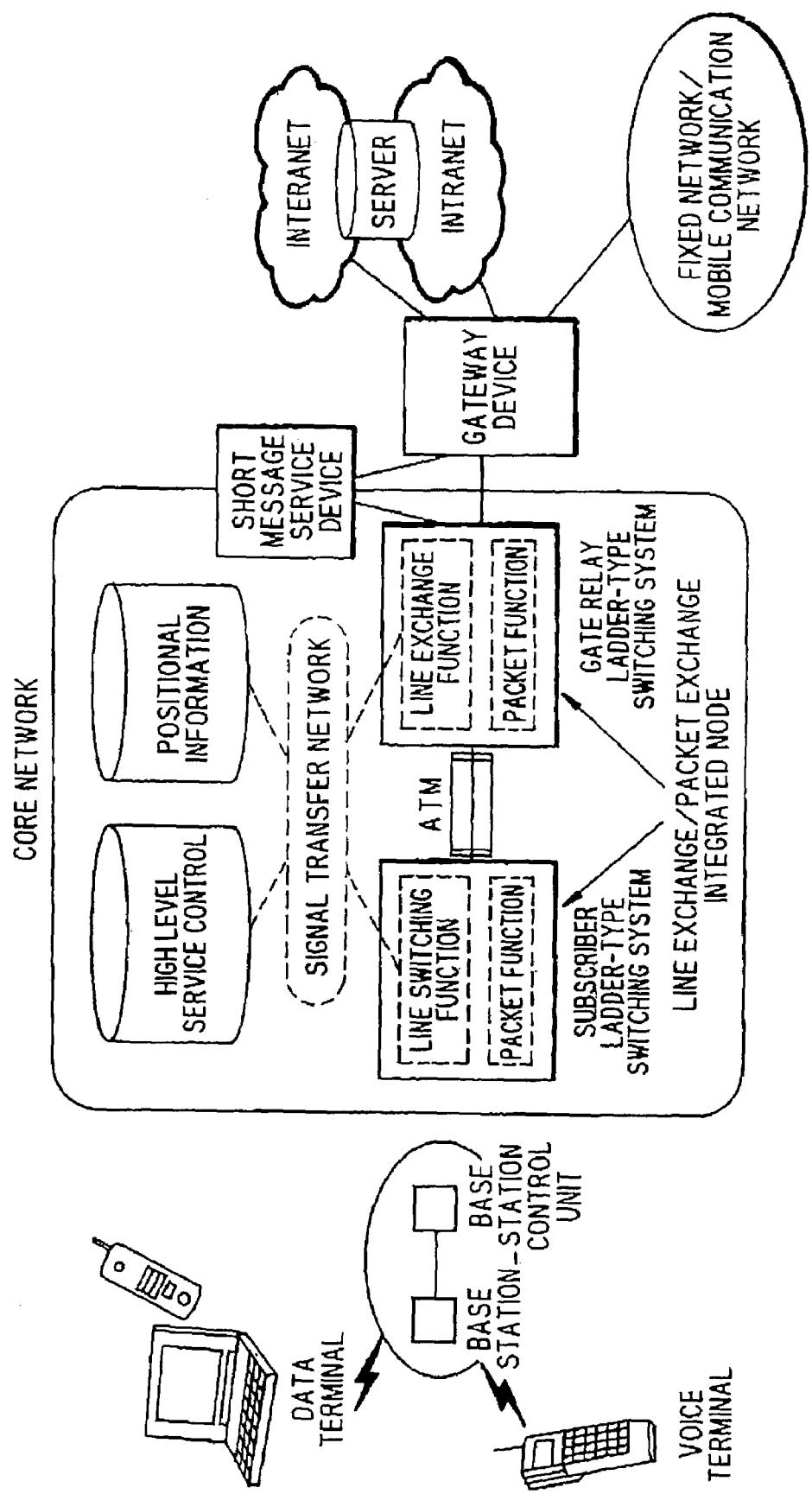
FIG. 14 is a diagram showing the construction of a 3 GPP core network to which the invention has been applied.

Current PDC mobile packet communication systems (second generation) and next generation mobile communication IMT-2000 can provide a capability of easy access to the Internet. Accordingly, in the invention, the node on the communication network, which performs voice recognition, is not limited to the above switching center, and a construction may be adopted wherein voice recognition is carried out, for example, in a gateway or a router, which transmits voice signals or the like after packetization, and the results of the voice recognition are inserted into the packet, followed by the selection of a path for the other party's terminal and transmission of the packet. For example, in a core network system of 3GPP (third generation partnership project), as shown in FIG. 14, it is known that a line switching function (MSC (mobile services switching center)/GMSC (gateway MSC)) is integrated with a packet switching function (PDSN (packet data serving node)/PDGN (packet data gateway node)) to form a single node which can realize integral switching/transmission of various media from the voice traffic. The user IP (internet protocol) packet is subjected to tunneling by ATM-SVC (switched virtual connection) based on the node ATM (asynchronous transfer mode) address to provide QoS (quality of services). A construction may also be adopted wherein voice recognition is carried out in this core network and text data as a result of voice recognition are added to voice data, which are subjected to switching/transmission by line switching or packet switching, followed by transmission co the destination terminal. For a core network shown in FIG. 14, reference may be made to Keiji Tachikawa (supervisor), "W-CDMA Ido Tsushin Hoshiki (W-CDMA Mobile Communication System)," published by Maruzen Co., Ltd., Jun. 25, 2001, p. 239, FIG. 4.2, or Kota Kinoshita, "Yasashii IMT-2000 Daisan Sedai Ido Tsushin Hoshiki (Easily Understandable IMT-2000 Third Generation Mobile Communication system," published by The Telecommunications Association (TTA). May 10, 2001, p. 81, FIG. 5.2.

In the above preferred embodiment, by virtue of the construction wherein, on the communication network side, text data as a result of voice recognition are sent to the other party's terminal, processing load of DSP (digital signal processor), which executes voice recognition processing, or the like can be reduced, and an increase in consumption current of the battery driven terminal can be prevented.

The above preferred embodiments have been explained by taking, as an example, the construction of the portable telephone set such that the display unit has been integrated with the voice communication part. Alternatively, a construction may be adopted wherein the voice communication part is detachable from the display unit for displaying the picture and the voice communication part is separated from the display unit and is usable solely. For a portable telephone set wherein the voice communication part has been separated and rendered independently of the picture display/photographing part, reference may be made, for example, to Japanese Patent Laid-Open No. 50223/2000 of which the inventor is the same as the present inventor. The picture display/photographing part may be wirelessly communicated with the voice communication part through infrared, Bluetooth or the like. In the case of a construction wherein the voice communication part is separated from the display unit and rendered usable solely, the user can see the text displayed on the display unit without wearing the earphone microphone.

The portable telephone set may of course be a PHS (personal handyphone system) terminal, PDA (personal digital assistant) or the like. Alternatively, the portable telephone set may be a terminal such as a personal computer having a VoIP (voice over IP) function.

As described above, the invention has the following effects.

According to the invention, the provision of voice recognition means for converting the other party's voice signals to text data can facilitate the understanding of the contents of the other party's speech and can realize a conversation with the other communication party, for example, even under a noisy environment.

According to the invention, the portable telephone set is provided with an operation key for starting the conversion of the other party's speech to text data by voice recognition during calling upon the operation of the key. By virtue of this, during a conversation with the other communication party under a noisy environment, when the contents of the other party's speech cannot be clearly understood, the voice recognition can be advantageously easily started by keying.

Further, according to the invention, the other party's speech is converted by voice recognition to text data which can also be transmitted to the other communication party and displayed on the display unit of the other party's terminal. By virtue of this, the other communication party side can also understand the contents of his or her own speech through the text data obtained by the conversion. This can improve convenience.

According to the invention, the text data as a result of voice recognition on the talker side are sent to the other party's terminal. Therefore, the data can be displayed on the other party's terminal without undergoing noise in a transmission system or the like.

According to the invention, on a communication network side, text data as a result of voice recognition are sent to the other communication party's terminal. By virtue of this construction, processing load of the terminal can be reduced, and an increase in consumption current of the battery driven terminal can be prevented or reduced.

The invention has been described in detail with particular reference to preferred embodiments, but it will be understood that variations and modifications can be effected within the scope of the invention as set forth in the appended claims.

What is claimed is:

1. A terminal device as a first communication party's terminal, the terminal device comprising:
voice recognition means which, during a communication connection to a second communication party's terminal wherein the first and second parties carry on real-time communications through said terminals, when the mode is set to a voice recognition mode, receives, as digital voice signals, the second communication party's voice sent from the second communication party's terminal during the real-time communications and performs voice recognition to convert the digital voice signals to text data; and
control means for performing control in such a manner that the text data converted by the voice recognition means are output to the first communication party's terminal and to the second communication party's terminal from output means.

2. The terminal device according to claim 1, wherein the output means comprises display means and the text data are displayed on the display means.

3. A terminal device as a first communication party's terminal comprising:
voice recognition means for performing voice recognition of voice signals from a second communication party's terminal to convert the voice signals to text data; and
means for sending the text data as a result of the voice recognition to the second communication party's terminal,
wherein the first and second parties are engaged in real-time communications through said terminals.

4. A terminal device as a second communication party's terminal device for a communication connection to the terminal device according to claim 3, said second communication party's terminal device comprising:
means for receiving the text data sent from the terminal device according to claim 3 and for performing control in such a manner that the received text data are displayed on display means.

5. A terminal device as a first communication party's terminal comprising:
voice recognition means for performing voice recognition of voice signals from a second communication party's terminal to convert the voice signals to text data;
means for sending the text data as a result of the voice recognition to the second communication party's terminal; and
means for taking the text data out of the signals sent from the second communication party's terminal and for performing control in such a manner that the text data are displayed on display means,
wherein the first and second parties are engaged in real-time communications through said terminals.

6. The terminal device according to claim 5, which further comprises means for multiplexing the text data as a result of the voice recognition with signals to be sent to the second communication party's terminal and sending the multiplexed signals to the second communication party's terminal.

7. The terminal device according to claim 5, which further comprises means for multiplexing the text data as a result of the voice recognition with picture information to be sent to the second communication party's terminal and for sending the multiplexed signals to the second communication party's terminal.

8. The terminal device according to any one of claims 1, 3 or 5, wherein the voice recognition means receives, as input data, digital voice signals obtained by demodulating the second communication party's voice, sent from the second communication party's terminal, in demodulation means and expanding the demodulated signals in expansion means and performs the voice recognition.

9. A communication control method comprising:
performing, in a first communication party's terminal, voice recognition of voice signals sent from a second communication party's terminal, which is in communication connection to said first terminal, to convert the voice signals to text data wherein the first and second parties carry on real-time communications through said terminals;
sending the text data, as a result of the voice recognition, from said first terminal to said second communication party's terminal; and
performing, in said first terminal, control in such a manner that the text data as a result of the voice recognition of the voice signals sent from said second communication party's terminal are displayed on display means.

10. The communication control method according to claim 9, wherein
said terminals each are a terminal having a portable videotelephone function, and
said first terminal multiplexes the text data as a result of the voice recognition with picture information to be sent to said second communication party's terminal and sends the multiplexed signals to said second communication party's terminal.

* * * * *